(12) United States Patent
Hamilton et al.

(10) Patent No.: US 6,701,420 B1
(45) Date of Patent: Mar. 2, 2004

(54) MEMORY MANAGEMENT SYSTEM AND METHOD FOR ALLOCATING AND REUSING MEMORY

(75) Inventors: Michael T Hamilton, Fort Collins; Brett Edward Johnson, Windsor, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/241,469

(22) Filed: Feb. 1, 1999

(51) Int. Cl.[7] .............................................. G06F 12/00
(52) U.S. Cl. ........................ 711/170; 711/156; 711/165; 707/205
(58) Field of Search ................................. 711/170, 171, 711/172, 156, 163, 165; 709/104; 707/205

(56) References Cited

U.S. PATENT DOCUMENTS 5,784,697 A  *  7/1998  Funk et al. .................. 711/170
5,784,698 A  *  7/1998  Brady et al. ................. 711/171
6,058,460 A  *  5/2000  Nakhimovsky .............. 711/153

OTHER PUBLICATIONS

Kernighan et al. "The C Programming Language" AT&T Bell Laboratories, 2nd Ed., 1988. pp. 185–189.*

* cited by examiner

Primary Examiner—Matthew Kim
Assistant Examiner—Matthew D. Anderson

(57) ABSTRACT

A memory management system and method that quickly allocates and reuses memory for storage of data, such as display lists in a graphics system. The memory manager allocates memory without information regarding the amount of memory that is to be required while minimizing system-level memory allocation calls and maximizing the contiguity of the allocated memory which is used. The memory manager acquires from system memory a memory block that is of a predetermined size that is significantly larger than the anticipated memory size required to store a display list. The memory manager allocates to the display list that portion of the acquired memory block necessary for storing the display list, maintaining control over the unused portion of the acquired memory in a memory pool of available memory for future allocation to another display list without performing subsequent system-level calls.

24 Claims, 20 Drawing Sheets

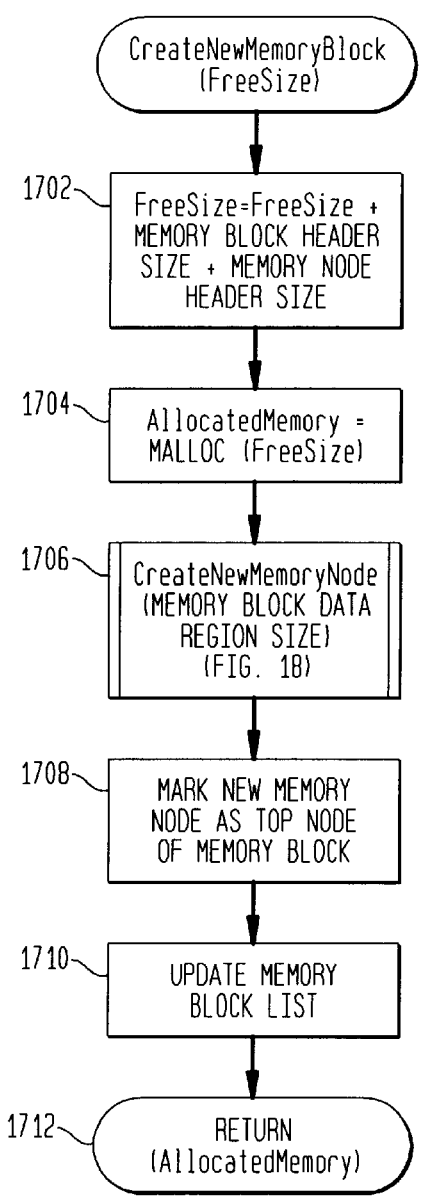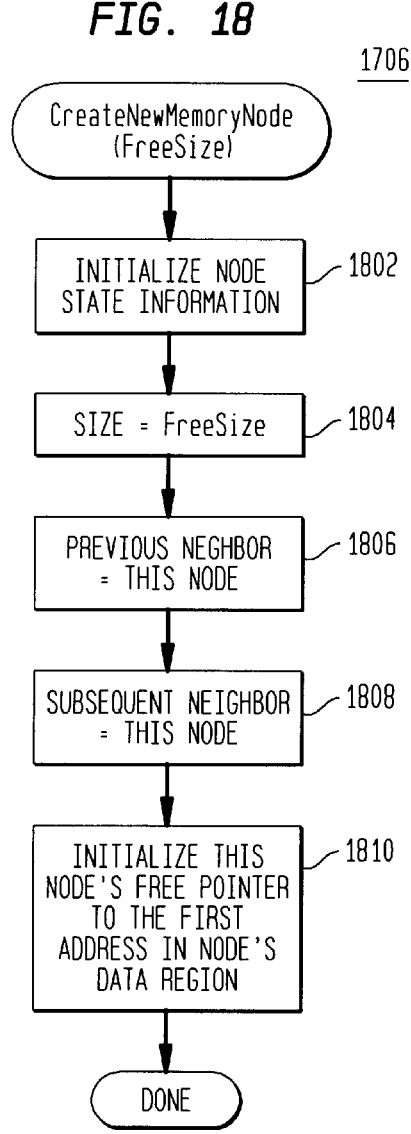

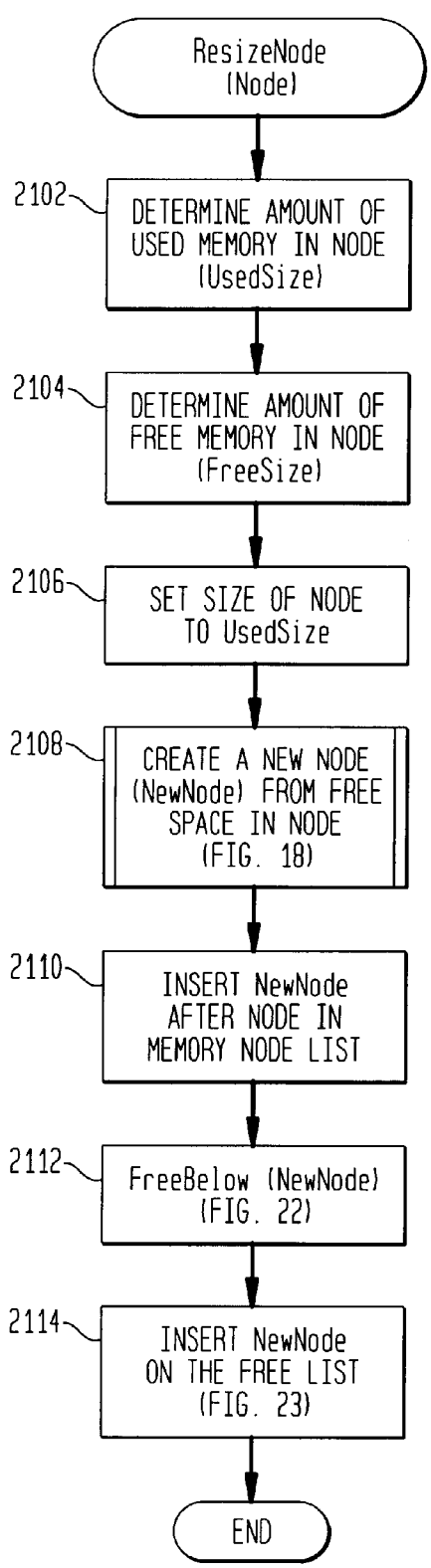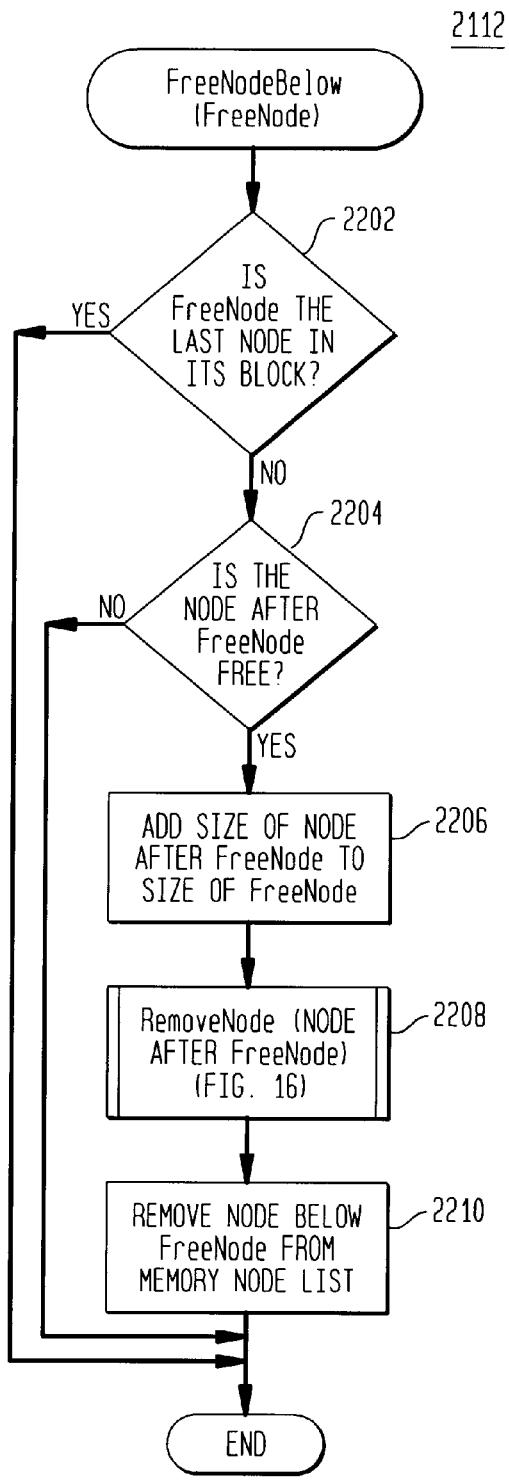

MEMORY MANAGEMENT SYSTEM AND METHOD FOR ALLOCATING AND REUSING MEMORY

BACKGROUND OF THE INVENTION

1. Field of the Invention

The present invention relates generally to memory management systems and techniques and, more particularly, to the efficient allocation and reuse of memory.

2. Related Art

Computer graphics systems are commonly used for displaying two- and three-dimensional graphical representations of objects on a two-dimensional video display screen. Current computer graphics systems provide highly detailed representations and are used in a variety of applications.

In a typical computer graphics system an object or model to be represented on the display screen is broken down into graphics primitives. Primitives are basic components of a graphics display and include, for example, points, lines, triangles, quadrilaterals, triangle strips and polygons. Typically, a hardware/software scheme is implemented to render, or draw, the graphics primitives that represent a view of one or more objects being represented on the display screen.

Generally, primitives of a three-dimensional model to be rendered are defined by a host computer in terms of primitive data. For example, the host computer may define a primitive in terms of the x, y, z, and w coordinates of its vertices, as well as the red, green, blue, and alpha color values of each vertex. Additional primitive data may be used in specific applications. Rendering hardware interprets the primitive data to compute the display screen pixels that represent each primitive, and the color values for each pixel.

A graphics interface is typically provided to enable graphics applications located on the host computer to efficiently control the graphics system. The graphics interface provides a library of specific function calls or commands that are used by a graphics application executing on the host computer to specify objects and operations, producing an interactive, three-dimensional graphics environment. Such a graphics interface is typically implemented with software drivers.

For example, the OpenGL® standard defines an application program interface (API) that provides specific commands that are used to provide interactive, three-dimensional applications. (OpenGL is a registered trademark of Silicon Graphics, Inc.). OpenGL is a streamlined, hardware-independent interface designed to be implemented on many different hardware platforms. As such, in computer systems which support OpenGL, the operating systems and graphics application software programs can make calls to the computer graphics system according to the standardized API without knowledge of the underlying hardware configuration. The OpenGL standard provides a complete library of low-level graphics manipulation commands for describing models of three-dimensional objects (the "GL" of "OpenGL" refers to "Graphics Library"). This standard was originally based on proprietary standards of Silicon Graphics, Inc., but was later transformed into an open standard which is used in high-end graphics-intensive workstations and, more recently, in high-end personal computers. The OpenGL standard is described in the OPENGL PROGRAMMING GUIDE, version 1.1 (1997), the OPENGL REFERENCE MANUAL, version 1.1 (1997), and a book by Segal and Akeley (of SGI) entitled THE OPENGL GRAPHICS SYSTEM: A SPECIFICATION (Version 1.2), all of which are hereby incorporated by reference in their entirety.

Graphics calls generated by a graphics application in accordance with the implemented API are provided to the graphics hardware in a continual stream, referred to herein as a graphics call sequence. Primitive data representing the graphics call sequences generated by a graphics application may be stored in a memory. The accumulated graphics call sequence is then executed by the graphics system to generate a display. Such graphics call sequences are commonly referred to as "display lists," while the memory used to temporarily store the display lists is commonly referred to as a "display list memory."

Storing primitive data, including vertex state (coordinate) and property state (color, lighting, etc.) data, in a display list requires the dynamic allocation of display list memory from system memory. As used herein, primitive data includes information descriptive of graphics calls in a graphics call sequence, including graphics commands and vertex data. In a graphics system implementing the OpenGL standard, for example, such graphics calls may include glBegin( ) calls (indicating the beginning of a graphics primitive data set), glVertexo calls (providing vertex data for a specified graphics primitive), and glEndo calls (indicating the end of a graphics primitive data set).

To store a display list in the display list memory, a graphics application typically begins by issuing a display list creation call requesting the formation of a new display list. For example, the OpenGL API includes a graphics call named glNewList( ) that is used to invoke the creation of a new display list. In response to the issuance of a display list creation call a display list manager, using techniques described below, typically requests that a region of system memory be allocated for storage of the display list. As used herein, the display list memory allocated to a single display list is referred to as a display list memory region. More than one display list may be simultaneously stored for execution in a display list memory; thus, a display list memory may have more than one display list memory region, each storing a single display list.

After issuing the display list creation call, primitive data descriptive of the graphics calls in the graphics call sequence are stored in the allocated display list memory region. Upon completion of the generation of the display list, the graphics application issues a display list completion call. The OpenGL API, for example, includes a glEndList( ) call indicating that generation of the display list is complete.

Graphics applications can also delete display lists. For example, in the OpenGL API, a glDeleteList( ) graphics call is provided to enable a graphics application to delete a display list when the display list will no longer be used. When deleted, the memory in which the display list is stored is typically returned to system memory for future allocation.

Efficient management of display list memory is critical, particularly in high-performance graphics systems. Some graphics applications generate thousands of display lists corresponding to one or more models that are part of a single frame to be displayed in a fraction of a second. As such, display list memory regions should be acquired from system memory very quickly. It is also important in high-performance graphics systems for display lists stored in display list memory to be accessible quickly. It is critical also that the graphics system be capable of deallocating (freeing) display list memory regions quickly and efficiently when a display list is subsequently deleted.

Typically, two types of data are stored in relation to the management of a display list memory. First, the actual data (that is, a display list) is stored in the allocated memory. Second, data created by the display list manager or other device or function for managing the display list memory are also stored in memory. The latter may include, for example, pointers, addresses and size of allocated memory regions, status flags and the like. Information that is descriptive of the memory being managed will be referred to herein as "memory management data." Efficient utilization of memory, including both display list memory used to store display lists and memory used to store memory management data, is critical because of the large amounts of data that the display list memory must be capable of storing, the variety of ways in which the display list memory maybe used, and the speed with which it must be accessed.

The above and other issues surrounding the dynamic allocation of memory and subsequent use thereof are well-known generally, as well as with regard to graphics systems. However, the display list memory must be allocated by the system prior to the display list manager determining the actual amount of memory that is required due to the manner in which graphics call sequences are generated. Although not unique to graphics system, such a circumstance is particularly problematic in graphics systems due to the speed at which the display list must be processed. In addition, graphics applications generate display lists with a wide variety of characteristics; there is no consistent manner in which the display lists are created. Nor do graphics system APIs dictate that the graphics applications provide information regarding the display list prior to the generation of the graphics call sequence.

As a result, there can be no assumptions made regarding the size or content of a display list. For example, some graphics applications generate thousands of small display lists while other graphics applications generate a single display list with thousands of graphics calls. Thus, efficient display list memory management is complicated by the fact that it is typically not possible, at the time the display list creation call is issued, for the graphics system to determine how much display list memory will be required to store the subsequently generated display list. It only becomes possible to determine the amount of display list memory needed to store a display list after all graphics calls have been stored in the display list memory and a display list completion call (e.g., glEndList( )) is issued.

One conventional approach to managing display list memory is to use standard system-level allocation and deallocation request function calls when necessary. For example, a malloc( ) system call is commonly available and utilized to provide a request to the operating system to allocate memory to the requesting system. The operating system allocates the requested size of virtual memory to the requesting system, which then utilizes it to store data; here, display lists.

However, the use of system-level function calls to allocate display list memory seriously impacts the performance of a graphics system due to the unnecessary overhead of managing system-wide resources. Executing a system-level call typically involves generating an interrupt to the operating system kernel, which prevents the operating system from performing other operations until execution of the memory allocation call is completed. Executing a system-level call each time a display list memory region needs to be allocated can therefore result in sub-optimal performance of the memory management system, particularly when a large number of display list memory regions are allocated to store a large number of small display lists.

In addition, since the amount of requisite memory is not known at the time the system-level functional call is issued, conventional display list managers often issue multiple system-level function calls to allocate the requisite memory for a particular display list; particularly if it is a large display list. As a result, this technique may store the display list in substantially noncontiguous memory locations and, therefore, is a poor choice for display list memory management.

To reduce the number of system-level memory requests, one conventional approach is to issue system-level requests for a large memory region from the system and to use a local routine to locally allocate the memory from the previously allocated larger memory region for the individual components of the display list.

The major disadvantage of this technique, however, is that it is sensitive to the potentially large variance in the amount of required memory for display list creation. Selection of a memory region that is relatively small can degrade performance to that of system-level requests and reduce memory contiguity, thereby further decreasing run-time performance. On the other hand, selection of a large block size wastes or fragments memory for display lists containing a relatively small amount of data. This can also degrade performance because the processor must support an application using much more memory than actually required.

In another conventional approach, large, dedicated physical memory is permanently available for temporary storage of the graphics calls as they are received by the display list manager. In such systems, the display list is accumulated in this dedicated memory device and, once accumulated, the display list manager issues a system-level call requesting the system to allocate the appropriate size memory for storage of the accumulated display list.

Although this approach addresses the noted problems associated with premature requests for system memory, there are a number of drawbacks that make the approach unattractive in many circumstances. First, providing a dedicated memory device is both costly and impracticable due to the limited physical space available for the device and supporting structure. In addition, as noted, there is significant variability in the manner in which display lists are generated. As a result, when there are large display lists, the dedicated buffer becomes full, causing the system to issue additional system-level calls. This, as noted, adversely impacts system performance. On the other hand, if a display list is relatively small, for example, 128K, several display lists may be accumulated prior to issuing the system-level call. However, since the memory required for each display list is unknown, the memory may become full prior to receipt of a complete display list. A subsequent system-level call is then required to store the remaining portion of the display list. Thus, this approach may result in noncontiguous display list memory.

Another traditional approach has been to dynamically request and acquire fixed size memory regions from system memory for display list storage. However, this approach is also sensitive to the varying display list usage patterns. Due to such variations, it is typically not possible to select a predetermined memory region size that will be appropriate for a wide variety of graphics applications provided by different vendors.

For example, a fixed memory region size of 4 Kbytes would result in an inefficient use of memory when the graphics application generates numerous 128 byte display lists. When used with such a graphics application, such an approach would run out of memory since the display list is consuming significantly more memory than necessary. Further, the unused portion of the acquired memory region remains unavailable for storage of subsequently-generated display lists, resulting in the inefficient use of display list memory.

On the other hand, when the display list is significantly larger than the fixed memory region size, the display list manager must repeatedly issue system-level memory allocation requests which, as noted, are very expensive operations. Also, the separately acquired memory regions are noncontiguous, adversely affecting the speed with which the display list can be accessed. Finally, the memory management data needed to manage such a large number of fixed-size memory regions can be considerable.

SUMMARY OF THE INVENTION

The present invention is a memory management system and method that quickly allocates and reuses memory for storage of data, such as display lists in a graphics system. Significantly, the present invention provides for the ability to efficiently allocate memory without information regarding the amount of memory that is to be required while minimizing system-level memory allocation calls and maximizing the contiguity of the allocated memory which is used. The present invention thereby increases display list creation- and run-time performance.

In one aspect of the invention, a memory manager is disclosed. The memory manager acquires from system memory a memory block that is of a predetermined size that is significantly larger than the anticipated memory size required to store a display list. The memory manager allocates to the display list that portion of the acquired memory necessary for storing the display list, maintaining control over the unused portion of the acquired memory in a memory pool of available memory for future allocation to another display list without performing a subsequent system-level call.

In another aspect of the invention, the memory manager allocates to a display list only the amount of memory needed to store the display list. The memory manager allocates memory to the display list; stores primitive data in the allocated memory; and returns any unused portion of the allocated memory to a memory pool for allocation to another display list.

One advantage of this aspect of the present invention is that increasing the size of the contiguous memory blocks acquired from system memory, reducing the number of expensive system-level calls and increases memory contiguity. Acquired memory which is unused for a current display list is available for allocation to a display list that is subsequently generated. This eliminates inefficient usage of allocated memory and significantly reduces memory fragmentation. This in turn increases overall run-time system performance of the implementing graphics system. Furthermore, memory is allocated for multiple display lists with a single system-level memory allocation request, thereby reducing the overhead associated with the acquisition of the system memory.

In another aspect of the present invention, a memory manager acquires from system memory a block of memory and logically divides the memory block into one or more memory nodes, each for storing at least a portion of a display list. Display lists may be stored in multiple memory nodes of the same or different memory blocks. The memory manager stores memory management data in the acquired memory with the display list data; that is, within the display list memory. In one particular embodiment, the memory management data is distributed across headers in each of the memory blocks and memory nodes. In one embodiment, the memory management data includes simply pointers and flags, thereby occupying minimal space in the memory blocks and nodes.

As noted, some conventional memory management systems maintain various memory management data such as pointers, block availability, block size and addresses, etc., in tables that are stored separately from the data which is stored within the managed memory. Such approaches are, as noted, inadequate for managing display lists due to the variability in display list size and number of display lists that may be stored at any given time, and, most notably, that memory requirements are not determinable until a time subsequent to the receipt of the display list for storage. The management memory would, therefore, also have to be acquired from system memory using system-level calls as the memory is required to manage the display list memory.

In addition, distributed storage of minimal memory management data across all acquired memory blocks and nodes overcomes drawbacks associated with this approach, including excessive number of system-level calls, memory fragmentation and noncontiguous storage of data. First, system-level calls are not issued separately to store both, the memory management data and the display list data; instead, a single system-level call is issued for both. Second, memory fragmentation and noncontiguous data associated with the storage of the memory management data is avoided since there are no external tables or other data structures in which management data is stored and there is ample memory available for creation of the header in which the management data is stored.

Furthermore, this aspect of the invention uses the minimal amount of memory possible to maintain display list memory. Furthermore, the size of the memory required to manage the memory blocks is minimal. For example, memory blocks need only maintain a pointer to the first node within the block, while the memory nodes maintain a header that includes two pairs of pointers each being part of a doubly-linked list, and a number of flags identifying the status and size of the node. Finally, this also provides efficient memory management operations due to the minimal amount of management data stored in block and node headers.

Another aspect of the present invention is directed to freeing allocated display list memory for reallocation to subsequent display lists without returning the allocated memory to the operating system. Another aspect of the present invention is directed to a method for coalescing free memory nodes within a display list memory. This enables the memory to be maintained within the memory pool without returning it (freeing) to the system memory, thereby eliminating the generation of a system-level call.

This aspect of the invention allows unused memory to be handed back to the memory pool for reuse by the next display list. Reusing memory eliminates memory waste and reduces the number of system-level allocation requests when memory is allocated for other display lists. The coalescing of free memory nodes increases the size of contiguous memory regions available for future allocation.

Various aspects of the present invention and embodiments thereof provide certain advantages and overcome certain drawbacks of conventional techniques. Not all aspects and embodiments share the same advantages and those that do may not share them under all circumstances. This being said, the present invention provides numerous advantages over conventional memory management systems and techniques. Specifically, disclosed aspects of the present invention allocate, reuse and/or otherwise efficiently manage memory in a graphics system in which display list data is stored for subsequent execution by a display list executor. These disclosed aspects, some of which are summarized below, are not to be construed as limiting in any regard; they are provided by way of example only and in no way restrict the scope of the invention.

In one aspect of the invention, a method for allocating memory to store display lists in response to an allocation request in a computer system is disclosed. The computer system includes an operating system executing on a host computer, system memory, and a graphics system. The method comprising the steps of: a) acquiring a portion of the system memory to form a memory pool; and b) allocating a portion of the memory pool to store a display list without making a system-level memory request to acquire memory from the operating system. Preferably, the portion of system memory is acquired using a system-level memory request.

In one embodiment, the memory pool includes at least one memory block acquired from the operating system using a system-level memory request. Each memory block includes one or more memory nodes for storing display list data. In this embodiment, step b) comprises a step of: 1) identifying a memory region within selected memory nodes that includes sufficient available memory to satisfy the allocation request. In alternative embodiments, step b) is performed only when the memory pool includes sufficient memory to satisfy the allocation request. In such embodiments, the method further includes the step of: c) acquiring additional memory from the operating system using a system-level memory request only when the memory pool does not include sufficient memory to satisfy the request; and d) allocating the additional memory to store display list data. In one embodiment, step c) includes acquiring additional memory from the operating system using a system-level memory request only when the second memory nodes do not include sufficient memory to satisfy the allocation request.

In certain implementations of this aspect of the invention, the memory pool comprises a plurality of first memory nodes including display list data and a plurality of second memory nodes not containing display list data. In these implementations, step b) includes the steps of: 1) determining whether the first memory nodes includes a memory node having sufficient available memory to satisfy the allocation request; 2) satisfying the request using a first memory node that has sufficient available memory to satisfy the allocation request when it is determined that at least one first memory node has sufficient available memory to satisfy the allocation request; and 3) satisfy the request using a second memory node when it is determined that no first memory node has sufficient available memory to satisfy the allocation request. In one particular embodiment, identifying data regarding said first memory nodes is maintained in a used list while identifying data regarding said second memory nodes is maintained in a free list.

In another aspect of the invention, a method for allocating memory to store display lists in response to an allocation request is disclosed. The computer system includes an operating system executing on a host computer, system memory, and a graphics system. The method includes steps of a) acquiring a portion of the system memory to form a memory pool; and b) allocating a portion of the memory pool having a size corresponding to an amount of the display list data. Preferably, step b) includes steps of: 1) allocating a region of the memory pool to store display list data; 2) allowing for the storage of the display list data in the allocated memory region; and 3) providing, after step 2), to the memory pool a portion of the allocated region that does not include display list data. In one preferred embodiment, the memory pool comprises a plurality of memory nodes. In this embodiment, step b)1) includes the step of allocating a portion of at least one memory node to store display list data. Step b)3) then includes the step of: i) dividing the at least one memory node into (a) at least one full memory node that includes a part of the at least one memory node that has stored therein display list data, and (b) at least one free memory node that includes a part of the at least one memory node that does not have display list data stored therein. This step is preferably performed without returning the allocated region that does not include display list data to the operating system.

In another aspect of the invention, a method for allocating memory to store display lists in response to an allocation request is disclosed. A computer system including a operating system executing on a host computer, system memory and a graphics system is provided. The method includes the steps of: a) acquiring a portion of the system memory to form a memory pool; b) allocating a portion of the memory pool for storage of first occurring display list data; and c) freeing the allocated portion of the memory pool for storage of second occurring display list data without making a system-level call to free the portion of the memory pool. The method also can include a step d) allocating the freed portion of the memory pool to store the second occurring display list data. Preferably, step d) is performed without making a system-level memory request to acquire memory from the operating system.

In one embodiment, the memory pool includes a plurality of memory nodes, each memory node having state information identifying a current state of the memory node, the current state including a used state and a free state. In this embodiment, step b) includes a step of: 1) modifying the state information of at least one memory node that includes the allocated portion of the memory pool for storage of a first occurring display list data to indicate that the at least one memory node is used. Step c) includes a step of: 1) modifying the state information of one or more memory nodes that include the allocated portion of the memory pool for storage of first occurring display list data to indicate that the memory node is free.

In another aspect of the invention, a computer system including a processor that executes an operating system and a graphics system and a memory pool to store display list data is disclosed, with a portion of the memory pool is allocated to store display list data. The method includes a step of: a) freeing, for subsequent allocation to store display list data, an unused part of the memory pool portion wherein the freeing step is achieved without returning the unused part of the memory pool to system memory. In this embodiment, the portion of the memory pool includes a plurality of memory nodes. In this embodiment, step a) includes a step of: b) dividing each of the plurality of memory nodes into (a) at least one full memory node that includes a part of the plurality of memory nodes that has stored therein display list data, and (b) at least one free memory node that includes a part of the plurality of memory nodes that does not have display list data stored therein. In another embodiment, the memory pool includes a plurality of memory nodes. Each memory node has state information identifying a current state of the memory node, the current state including a used state and a free state. In this embodiment, step b) includes the steps of: 1) modifying the state information of the at least one full memory node to indicate that the at least one full memory node is used; and 2) modifying the state information of the at least one free memory node to indicate that the at least one free memory node is free.

In another aspect of the invention, a method for freeing a region of memory within a memory pool allocated to store display list data is disclosed. The method is performed in a computer system that includes a processor that executes an operating system and a graphics system and the memory pool to store display list data. The method includes the step of freeing the allocated region of memory without returning the allocated region of the memory pool to system memory. In one preferred embodiment, the allocated region of the memory pool includes at least one memory node. Each memory node has state information identifying a current state of the memory node, the current state including a used state and a free state. Step a) comprises a step of 1) modifying the state information of the at least one memory node to indicate that the at least one memory node is free. In another embodiment, the method also includes a step of: c) coalescing the allocated region of memory with at least one region of memory in the memory pool contiguous with the allocated region of memory and not containing primitive data into a coalesced region of memory having a size equal to a sum of the sizes of the allocated region of memory and the at least one contiguous region of memory.

In another aspect of the invention, a method for managing a memory pool is disclosed. The memory pool resides in a graphics system to store display list data. The method includes the steps of: a) storing display list data in a first portion of the memory pool; and b) storing in a second portion of the memory pool memory management information to manage the first portion of the memory pool.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

BRIEF DESCRIPTION OF THE DRAWINGS

The foregoing and other features and advantages of the present invention will be understood more clearly from the following detailed description and from the accompanying figures. This description is given by way of example only and in no way restricts the scope of the invention. In the figures:

FIG. 17 is a flow chart of a process performed by memory manager to create a new memory block in accordance with one embodiment of the present invention.

FIG. 18 is a flow chart of a process performed by memory manager to create a new memory node in accordance with one embodiment of the present invention.

FIG. 21 is a flow chart of the processes performed to resize individual memory nodes in accordance with one embodiment of the present invention.

FIG. 22 is a flow chart of the processes performed to coalesce memory nodes in accordance with one embodiment of the present invention.

DETAILED DESCRIPTION

Figure 1:
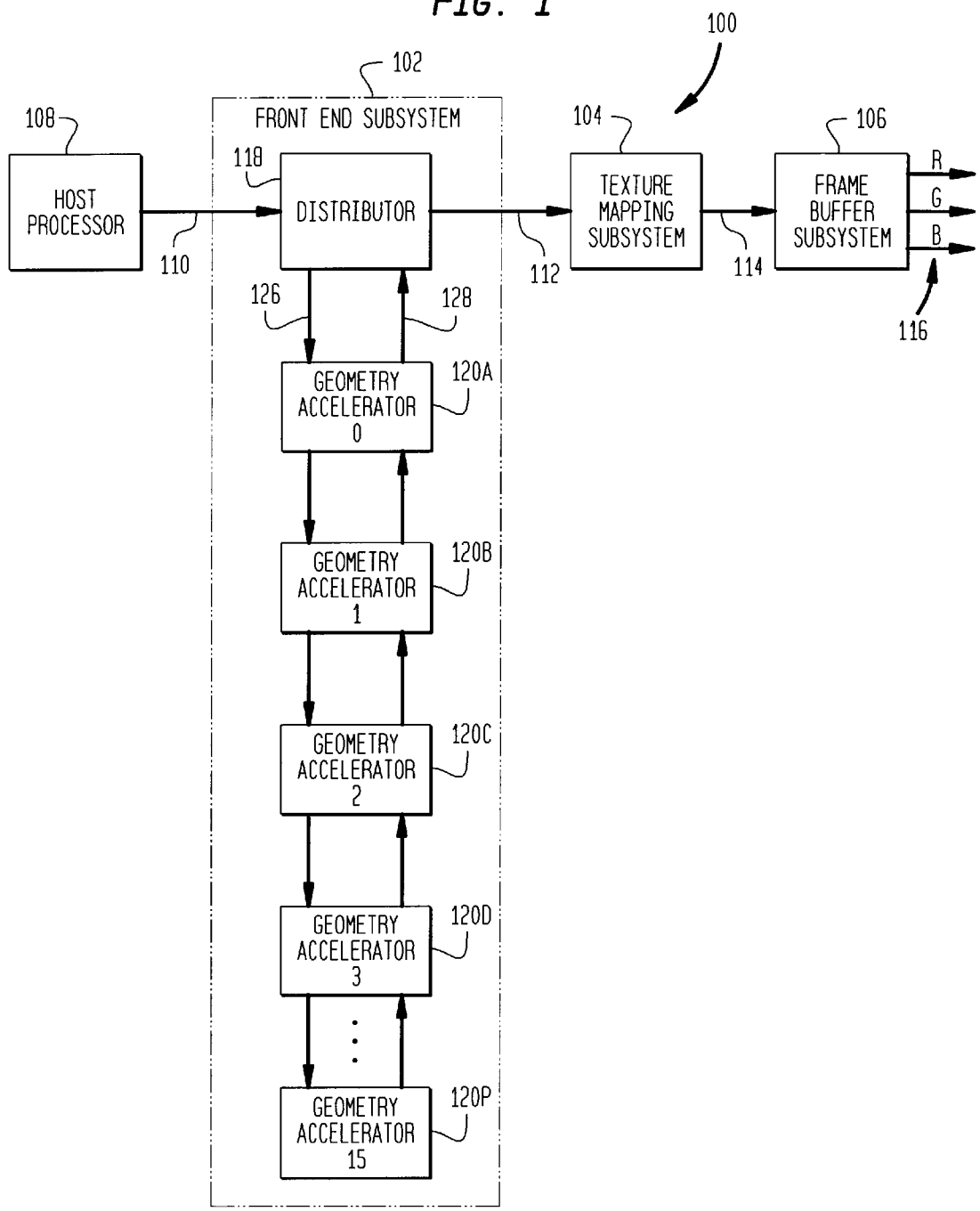
FIG. 1 is a block diagram of an exemplary computer graphics system in which the present invention may be implemented.

The present invention is a system and method for dynamically managing memory in a computer-based system, such as graphics system. FIG. 1 is a block diagram of an exemplary computer graphics system 100 suitable for implementing embodiments of the memory management system and methodology of the present invention. As shown, graphics system 100 includes a front-end subsystem 102, a texture mapping subsystem 104 and a frame buffer subsystem 106. Front-end subsystem 102 receives over bus 110 primitives to be rendered from a graphics application program executing on the host computer 108. The primitives are typically specified by X, Y, Z and W coordinate data and R, G, B and α color data and texture S, T, R and Q coordinates for portions of the primitives, such as vertices.

Data representing the primitives in three dimensions are provided by front-end subsystem 102 to frame buffer subsystem 106 over bus 112 to the optional texture mapping subsystem 104. Texture mapping subsystem 104 interpolates the received primitive data to provide values from stored texture maps to frame buffer subsystem 106 over one or more buses 114.

Frame buffer subsystem 106 interpolates the primitive data received from front-end subsystem 102 to compute the pixels on the display screen that will represent each primitive, and to determine object color values and Z values for each pixel. Frame buffer subsystem 106 combines, on a pixel-by-pixel basis, the object color values with the resulting texture data provided from optional texture mapping subsystem 104, to generate resulting image R, G and B values for each pixel. R, G and B color control signals for each pixel are respectively provided over R, G and B lines 116 to control the pixels of the display screen (not shown) to display a resulting image on the display screen that represents the texture-mapped primitive.

Front-end subsystem 102 includes a distributor 118 and a plurality of three-dimensional geometry accelerators 120A–120P (collectively and generally referred to as geometry accelerators 120). Distributor 118 receives the coordinate and other primitive data over bus 110 from a graphics application on host computer 108. In this illustrative graphics system environment, distributor 118 dynamically allocates the primitive data among geometry accelerators 120.

Primitive data, including vertex state (coordinate) and property state (color, lighting, etc.) data, is provided over bus 126 to geometry accelerators 120. Each geometry accelerator 120 performs well-known geometry accelerator functions to generate rendering data for frame buffer subsystem 106. Rendering data generated by geometry accelerators 120 is provided over output bus 128 to distributor 118. Distributor 118 reformats the primitive output data (that is, rendering data) received from the geometry accelerators 120, performs a floating-point to fixed-point conversion, and provides the primitive data stream over bus 112 to the optional texture-mapping subsystem 104 and, subsequently, to frame buffer subsystem 106.

Texture mapping subsystem 104 and frame buffer subsystem 106 may be any well-known systems now or later developed. Furthermore, front-end subsystem 102, texture mapping subsystem 104 and frame buffer subsystem 106 are preferably pipelined and operate on multiple primitives simultaneously. While texture mapping subsystem 104 and frame buffer subsystem 106 operate on primitives previously provided by front-end subsystem 102, front-end subsystem 102 continues to operate and provide new primitives until pipelines in subsystems 104 and 106 become full.

It should be understood from this disclosure that the present invention may be implemented in any computer-based system that may benefit from the dynamic management of memory resources. Graphics system 100 is utilized herein as just one such implementation since graphics systems may particularly benefit from the present invention; the presentation of graphics system 100 herein should not to be considered limiting in any respect.

Figure 2:
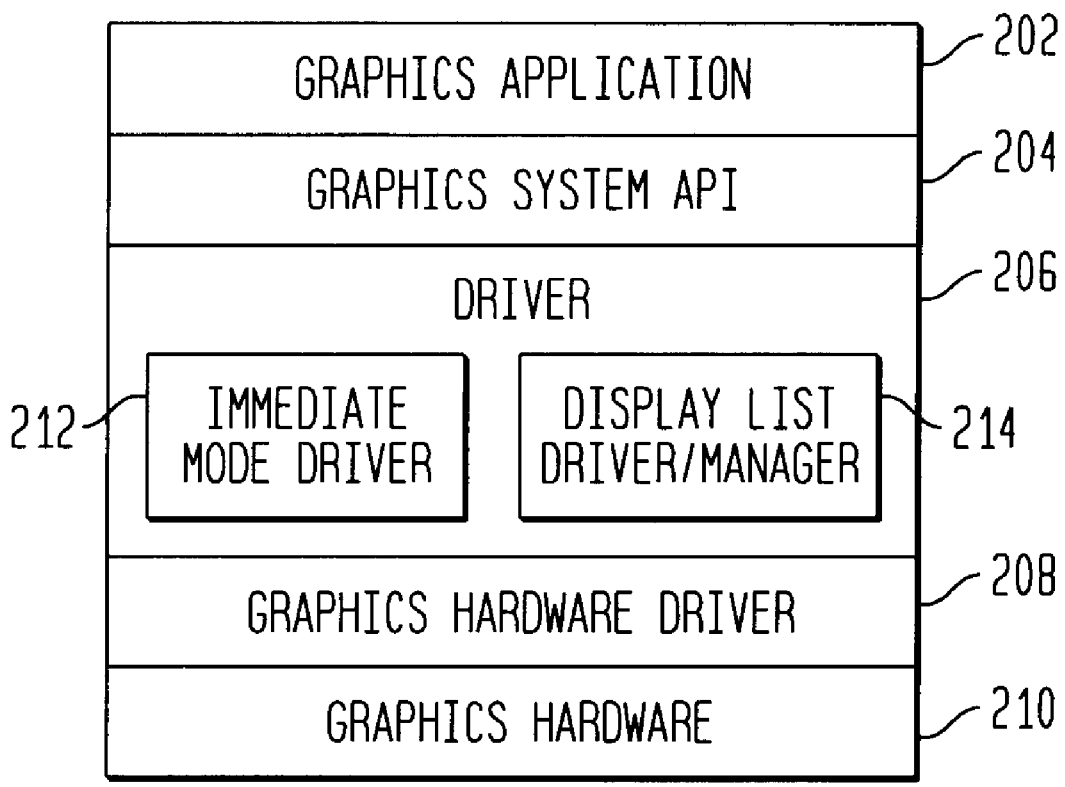
FIG. 2 is a block diagram illustrating an embodiment of the memory management system of the present invention implemented in a display list driver in a graphics system environment.

FIG. 2 is a block diagram illustrating an embodiment of the memory management system of the present invention implemented in a display list driver 312 in a graphics system environment such as graphics system 100. A graphics application 202 executed on host computer 108 issues graphics calls in accordance with a graphics system application program interface (API) 204. Graphics calls issued by graphics application 202 are forwarded by graphics system API 204 to a driver 206 residing on host computer 108.

In one embodiment of the present invention in which graphics system API 204 is implemented according to the OpenGL standard, graphics application 202 can select one of two available modes in which to issue graphics calls at any given time. An immediate mode driver 212 executes graphics calls issued by graphics application 202 for immediate execution by graphics system 100 ("immediate mode"). Immediate mode driver 212 is well-known in the art and will therefore not be described further herein. Graphics calls issued by graphics application 202 that are to be stored in a display list memory prior to execution by graphics hardware 210 are processed by a display list driver/manager 214. Display list driver 214 is described in detail below.

As noted, in the illustrative implementation illustrated in FIG. 2, the memory management system of the present invention is implemented in driver 214. In particular, and as will be explained in more detail below, in one embodiment of the disclosed aspects of the present invention, display list driver 214 efficiently manages the storage of display lists as they are generated by graphics application 202. As described in more detail below, display list driver 214 creates and maintains a memory pool of memory blocks acquired from system memory and efficiently allocates and reuses the memory blocks and portions thereof so as to store a graphics call sequence generated by graphics application 202 in substantially contiguous memory locations while minimizing system-level memory allocation requests.

Driver 214 forwards display list graphics calls to a hardware driver 208 that converts the graphics calls as required to communicate with graphics hardware 210 and/or that passes the calls through to graphics hardware 210. Aspects of front-end subsystem 102, texture-mapping subsystem 104, and frame buffer subsystem 106 (FIG. 1) maybe implemented in graphics hardware 210. Display list driver 214 forwards to hardware driver 208 an optimized graphics call sequence to be executed.

Figure 3:
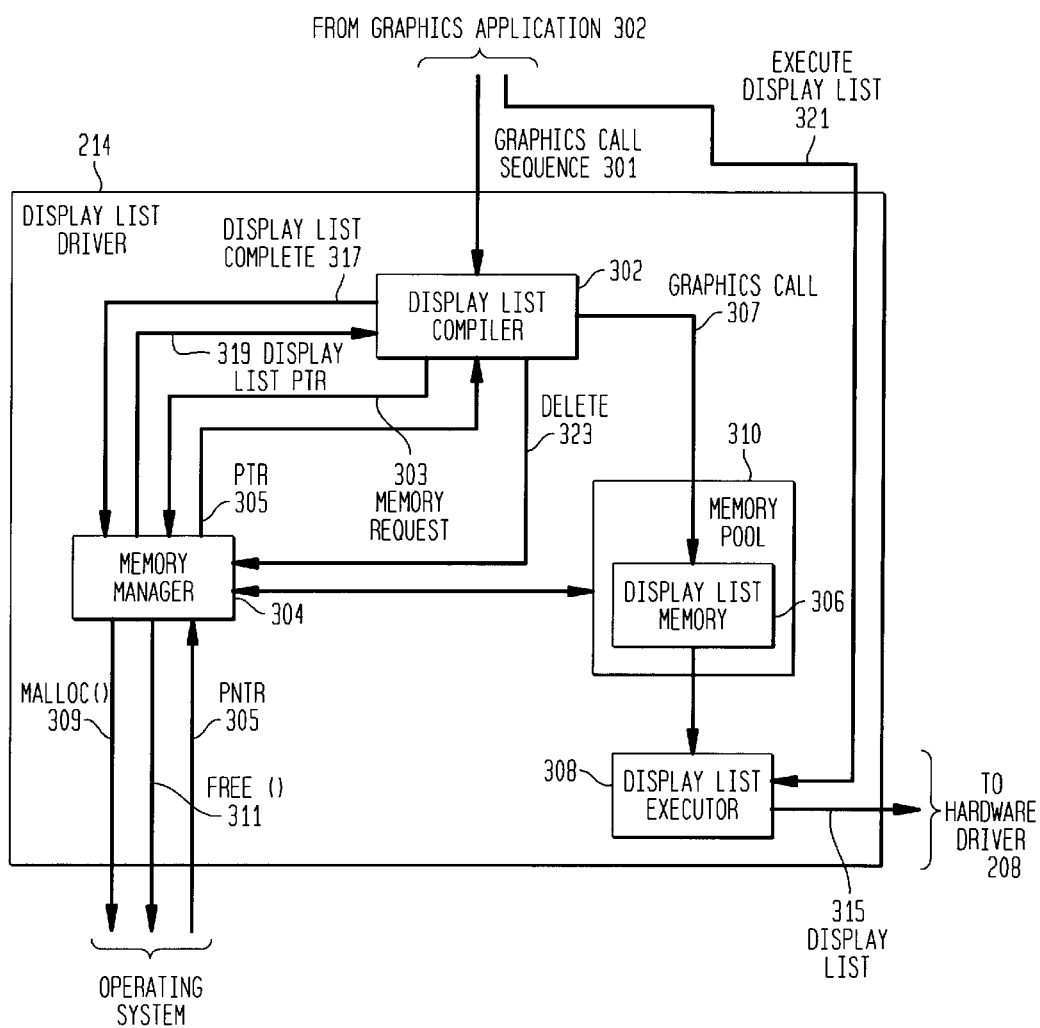
FIG. 3 is a block diagram of one embodiment of the memory manager of the present invention implemented in a display list manager to manage memory relating to a display list memory.

FIG. 3 is a block diagram of one embodiment of the memory manager of the present invention implemented in display list driver/manager 214 to manage display list memory. Graphics call sequences 301 are received from graphics application 202 by display list manager 214. Upon receipt of a graphics call indicating the beginning of a new display list (glNewList( )), a display list compiler 302 generates a request for memory to store the graphics calls. As noted, graphics application 302 does not inform display list compiler 302 of the number of graphics calls that are included in graphics call sequence 301. As such, display list compiler 302 generates a memory request prior to display list compiler 302 determining the number of graphics calls in graphics call sequence 301.

Conventionally, display list compiler 302 generates a system-level call requesting the operating system to allocate system memory to the compiler for storage of the display lists. In one embodiment of the present invention, display list compiler 302 issues the same system-level call and memory manager 304 intercepts and processes the call as described below. In an alternative embodiment, display list compiler 302 is modified to issue a request other than the conventional system-level call. Memory manager 304 is configured to receive such a request and will process it as described below. This enables memory manager 304 to provide a transparent interface between the display list compiler 302 and memory pool 310.

In the illustrative embodiment, memory manager 304 manages memory pool 310 to store graphics calls 307 in a display list memory region. Memory manager 304 acquires memory from system memory for use in memory pool 310 and manages the memory pool 310 to efficiently manage display list memory 306. As will be described in detail below, memory pool 310 includes structures in addition to display list memory 306 and, as such, is shown to encompass display list memory 306 in FIG. 3. A display list executor 308 executes the display list(s) stored in display list memory 306, forwarding the primitive data to graphics hardware driver 308, as is well-known in the art.

In accordance with the present invention, memory manager 304 dynamically creates and manages a logical association of individually acquired memory blocks for storage of display lists. Memory manager 304 acquires large contiguous memory blocks from system memory using an appropriate system-level call such as malloc( ). Once acquired, memory manager 304 allocates all or a portion of the acquired memory blocks to display lists when required, and maintains the status of those memory blocks or portions thereof which are not currently being used to store a display list so that they are available for future allocation.

As a memory block (or portion thereof) is no longer needed to store display lists, whether due to a display list not occupying a complete memory block or a previously-stored display list being deleted by graphics application 302, memory manager 304 deallocates the memory in the memory block without returning the freed memory to system memory. As will be described in detail below, this eliminates the need to issue additional system-level calls to reacquire the memory from system memory when a subsequent display list is to be stored.

In certain aspects of the invention described below, memory manager 304 coalesces freed memory blocks or regions thereof when possible to form the largest possible contiguous memory locations within memory pool 310. This maximizes the contiguity of the memory locations in which a single display list is stored and reduces the memory management overhead associated with the available memory locations.

In certain other aspects of the invention (also described below), memory pool 310 significantly reduces memory management overhead associated with the separate storage of memory management data, including the generation of numerous system-level calls, by storing that data in memory pool 310 with the display list data. Unique memory management techniques are included in other aspects of the invention that result in the creation and maintenance of minimal management data, facilitating the speed at which the memory within memory pool 310 is managed and accessed.

Figure 4:
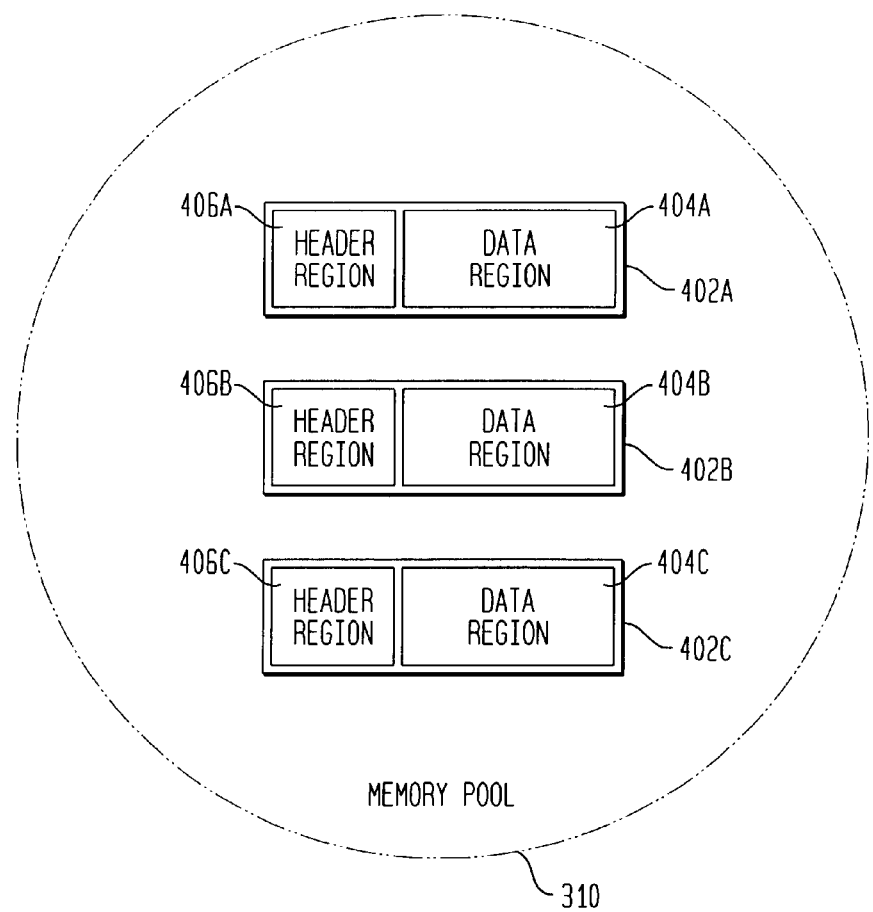
FIG. 4 is a schematic block diagram illustrating a memory pool in accordance with one embodiment of the invention including three memory blocks.
Figure 5:
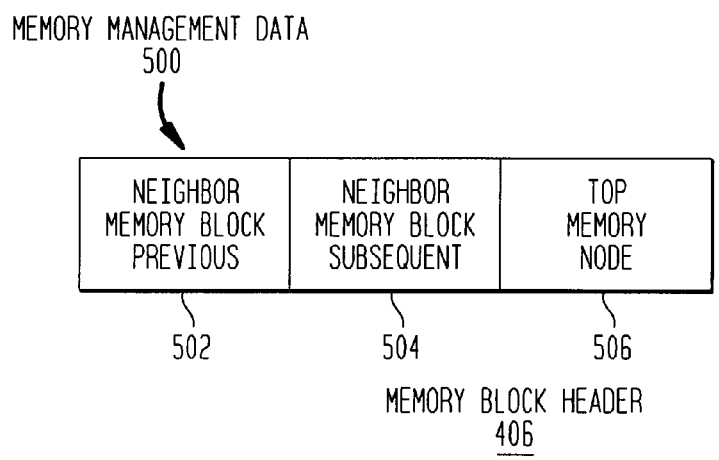
FIG. 5 is a block diagram illustrating the contents of a memory block header in accordance with one embodiment of the present invention.
Figure 6:
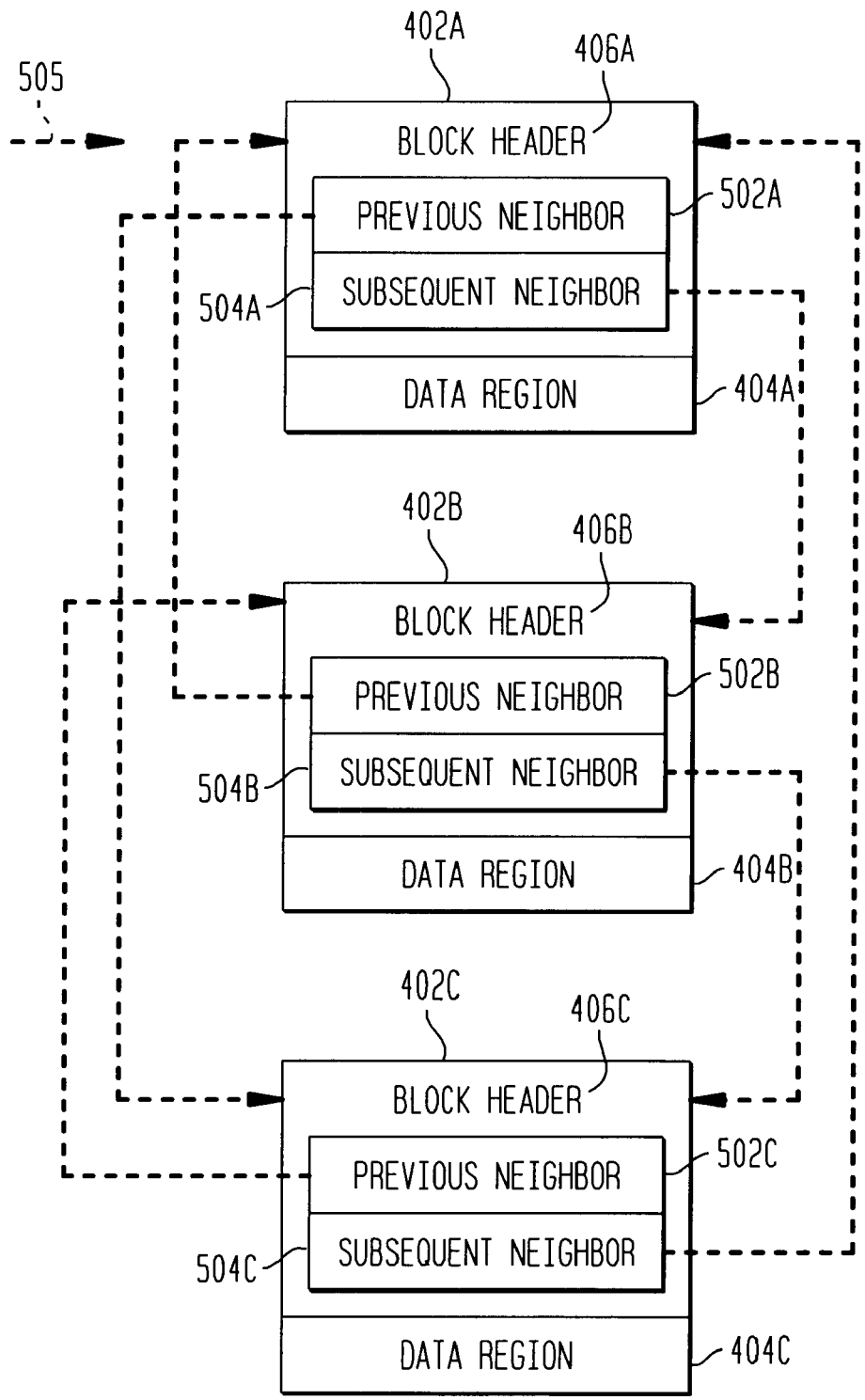
FIG. 6 is a block diagram illustrating the linking of memory blocks in accordance with one embodiment of the invention.
Figure 7:
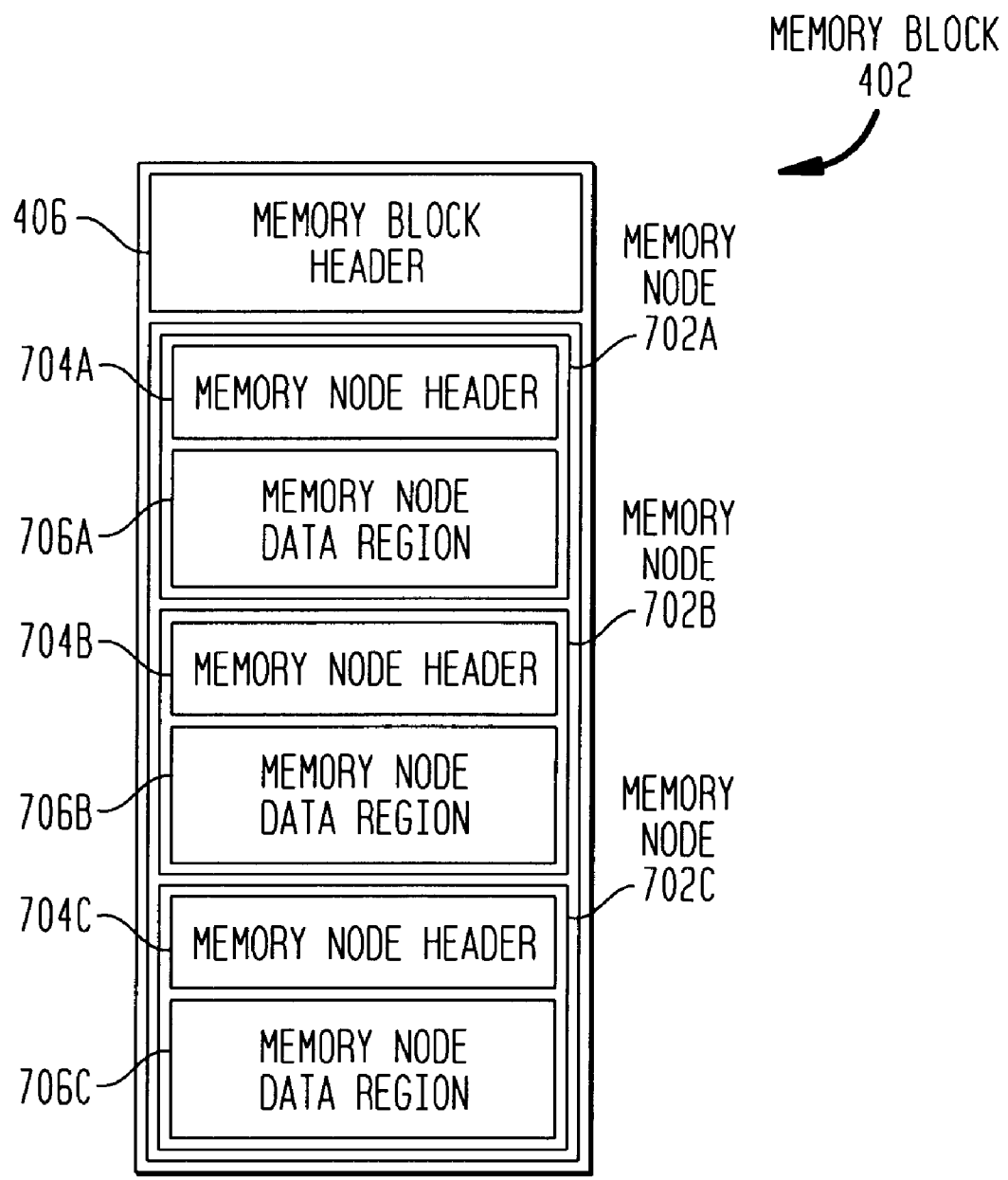
FIG. 7 is a block diagram illustrating exemplary contents of a single memory block in accordance with one aspect of the present invention.
Figure 8:
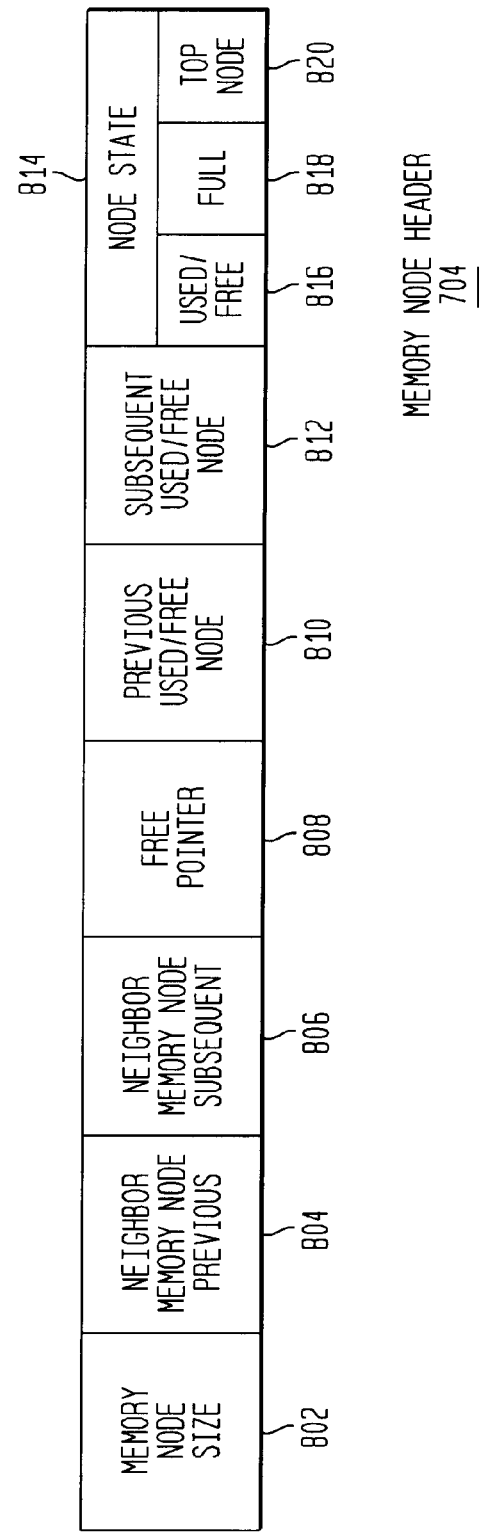
FIG. 8 is a block diagram illustrating the contents of one embodiment of memory node headers shown in FIG. 7.
Figure 9:
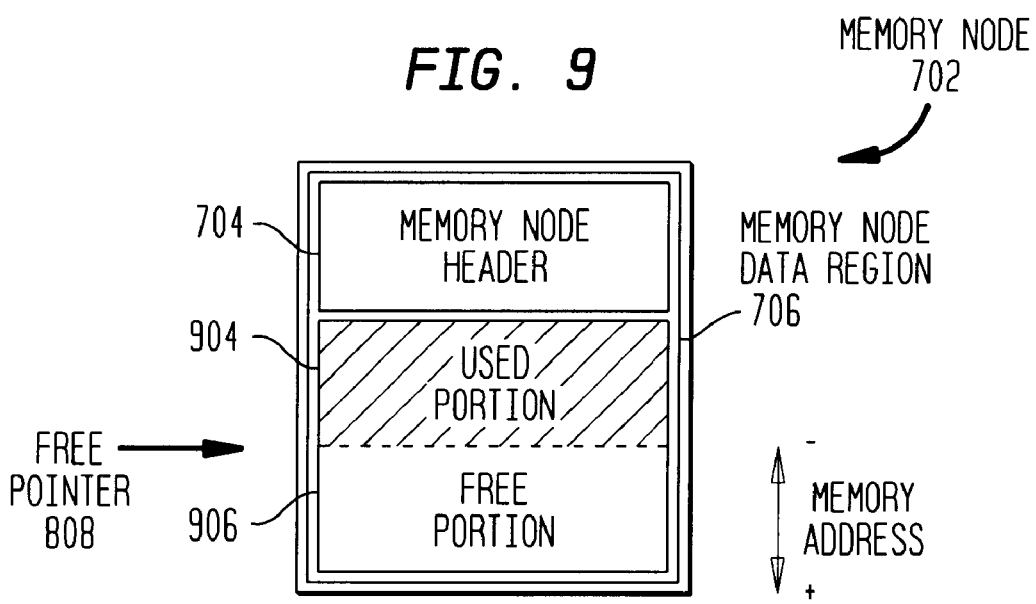
FIG. 9 is a diagram illustrating a memory node that is currently being used to receive display list data.

Memory pool 310 will now be described with reference to FIGS. 4–25. FIG. 4 is a schematic block diagram illustrating one embodiment of memory pool 310 with three memory blocks 402A, 402B and 402C (collectively and generally referred to as memory blocks 402). FIG. 5 is a block diagram illustrating the contents of a memory block header 406. FIG. 6 illustrates the linking of memory blocks in accordance with one embodiment of the invention. FIG. 7 is a block diagram illustrating exemplary contents of a single memory block in accordance with one aspect of the present invention. FIG. 8 is a block diagram illustrating the contents of one embodiment of memory node headers introduced in FIG. 7. FIG. 9 is a diagram illustrating a memory node in which display list data (that is, primitive data) is currently being stored. In one embodiment of the present invention, memory manager 304 is implemented as a memory manager object according to an object-oriented programming language, such as C++, SmallTalk, or Java. The memory pool manager class defines data members for storing data associated with the memory pool objects and member functions for performing operations.

Memory block 402 is a contiguous region of physical memory acquired from system memory and logically incorporated into memory pool 310 by memory manager 304. Memory pool manager 304 acquires memory blocks 402 from system memory on an as-needed basis as described in greater detail below. As noted, such acquisition is achieved by performing a system-level memory allocation request (malloc( )) requesting a particular quantity of memory.

Memory blocks 402 include data regions 404 in which display list data are stored. In accordance with one aspect of the present invention, each memory block 402 also includes a header region 406 in which memory management data is stored. Memory management data, described in detail below, generally includes such physical memory links and interface operators to enable memory manager 304 to allocate, resize and deallocate each memory block 402.

One example of the contents of memory headers 406 is shown in FIG. 5. The memory management data 500 associated with the memory of memory blocks 402 includes an ordered memory block list. The memory block list includes pointers to each of the memory blocks 402 that have been acquired from system memory and logically included in memory pool 310. In one preferred aspect of the invention, the memory block list is stored in memory pool 310. In one particular embodiment, the memory block list is distributed within each of the memory blocks 402 in memory pool 310. Specifically, each memory block header 406 stores part or all the memory management data 500 associated with the management of memory blocks 402.

Referring to FIG. 5, the memory block list includes a pair of pointers in each memory block header 406: a previous neighboring memory block pointer 502 and a subsequent neighboring memory block pointer 504. In one embodiment, pointers 502, 504 identify the location of the first memory location of the corresponding neighboring memory block 402. Together, these pointers form a doubly-linked memory block list that is used by memory manager 304 to control the allocation and use of the memory pool 310. FIG. 6 illustrates the linking of memory blocks 402 in accordance with one embodiment of the invention. In this illustrative example, the three memory blocks 402 illustrated in FIG. 4 are shown in FIG. 6, with the size of headers 406 relative to data regions 404 exaggerated to facilitate the description of pointers 502, 504.

In the illustrative embodiment, the memory block list is implemented as a circular doubly-linked list, such that each element (memory block 402) in the list has a link to the next element in the list (the "subsequent block") and a link to the previous element in the list (the "previous block link"). The pointer 504 of the last allocated memory block 402C links the last allocated memory block 402C to the first allocated memory block 402A; similarly, the previous block link 502A of the first allocated memory block 402A links the first allocated memory block 402A to the last allocated memory block 402C. In alternative embodiments, the memory block list may be implemented as a conventional doubly-linked list.

It should be understood that, as noted, memory management data is stored within the memory pool in preferred aspects of the present invention only, and can be separately maintained by memory manager 304 in other aspects of the invention. However, by locating the memory management data 500 within memory blocks 402, memory manger 304 does not have to maintain, either internally or separately, tables and other data structures typically maintained by memory management systems. The only information that is maintained internally by memory manager 304 is a pointer to the first memory block 402A. This pointer is schematically represented by arrow 505.

When memory manager 304 acquires a memory block 402, memory manager 304 places the memory block 402 on the end of the memory block list. That is, pointers 502, 504 of the first and last memory blocks 402A, 402C are modified to reference the new memory block rather than each other.

Referring again to FIG. 5, additional memory management data is included in headers 406. Specifically, a top memory node pointer 506 is a pointer to the memory address within the same memory block 402 at which an unused memory node is located. Memory nodes and this pointer 506 are described in detail below. As noted, memory manager 304 acquires large memory blocks 402 from system memory. As will be described in detail below, the manner in which memory manager 304 allocates the data region 404 of each memory block 402, all of the acquired memory locations within each memory block 402 may be used to store display lists. As such, the risk of wasting memory is substantially minimized; that is, the present invention substantially eliminates acquired but unused memory locations, a problem commonly associated with convention display list memory management schemes.

In one preferred embodiment, the default size of the acquired memory blocks 402 can be set by the graphics application vendor. In alternative embodiments, a constant size memory block 402 is implemented. In still other embodiments, the size of memory blocks 402 have the same size or sizes that vary according to detected conditions, such as current needs, or historical or current display list usage patterns.

FIG. 7 is a block diagram illustrating exemplary contents of a single memory block 402 in accordance with one aspect of the present invention. As shown therein, memory block 402 includes three memory nodes 702A, 702B and 702C (collectively and generally referred to as memory nodes 702). As shown, and as will become apparent from the following description, memory nodes 702 may be the same or different sizes.

Each memory node includes a header region 704 (704A, 704B and 704C, respectively) and a data region 706 (706A, 706B and 706C, respectively). In a manner similar to that noted above with respect to memory blocks 402, memory management data 800 (FIG. 8) associated with the management of memory nodes 702 are preferably distributed among memory node headers 704. Memory node data regions 706 store display list data. In one embodiment of the present invention, header region 704 of a memory node 702 occupies the top memory addresses of the memory node 702, and the memory addresses following header region 702 are used for display list data.

Generally, all or a portion of each memory block 402 is dynamically allocated to a display list. To insure utilization of only that portion of the memory block 402 necessary to store the desired display list data, the portion of a memory block 402 required to store the display list data is logically formed into a separately-managed memory node 702 (described below), with the remaining portion of the memory block 402, if any, logically formed into another separately managed memory node 702 which is then available for future allocation. In other words, memory manager 304 organizes each memory block 402 into one or more memory nodes 702 as required to insure only that portion of a memory block 402 necessary to store display list data is actually used for such purposes. Since memory block 402 was acquired from system memory through a single system-level request, memory block 402 is contiguous. It follows then, that each memory node 702 within a memory block 402 is also a logical unit of storage corresponding to a single contiguous range of memory addresses.

When display list compiler 302 requests memory in which to store graphics calls of a display list, memory manager 304 satisfies the request by providing the display list compiler 302 with a pointer 305 to a memory node 702 data region. If the size of the memory node 702 is not large enough to store the graphics calls, memory manager 304 uses other available memory nodes 702 in memory pool 310 or acquires additional system memory. In one preferred embodiment, memory manager 304 acquires additional system memory when there is no available memory node 702 in memory pool 310 that has a data region sufficient to satisfy the memory request 303 from compiler 302. Thus, a display list may be stored in a single memory node or may span multiple memory nodes in the same or multiple memory blocks 402.

The contents of memory node headers 704 will now be described with reference to the exemplary embodiment illustrated in FIG. 8. The memory management data associated with the management of memory nodes 702 is referred to herein as memory management data 800. In one embodiment of the present invention, memory manager 304 maintains, for each memory block 402, a list of the memory nodes 702 contained within a memory block 402, referred to herein as a memory node list. The memory node list is implemented in certain aspects of the present invention to enable memory manager 304 to identify the neighboring memory nodes of each memory node 702 within a memory block 402.

The memory node list includes a pair of neighbor node pointers in each memory node header 704. A previous neighboring memory node pointer 804 and a subsequent neighboring memory node pointer 806 constitute this pair of pointers. In one embodiment, pointers 804, 806 identify the location of the first memory location of the corresponding neighboring memory node 702. Together, these pointers form a doubly-linked memory node list that is used by memory manager 304 to control the allocation and use of memory pool 310. In the illustrative embodiment, the memory node list is implemented as a circular doubly-linked list, such that each memory node 702 in the list has a link to the subsequent and previous memory nodes. Pointer 806 of the last allocated memory node (node 702C, for example) links the last allocated memory node 702C to the first memory node 702A; similarly, the previous link 804 of the first memory node 702A links the first memory node 702A to the last memory node 702C. Thus, the linking of memory nodes 702 in accordance with this embodiment of the invention is similar to that described above with reference to FIG. 6 and the memory block list. In alternative embodiments, the memory node list may be implemented as a conventional doubly-linked list.

As noted, memory block header 406 includes a top node pointer 506 that points to the top memory node 702 in memory block 402. This pointer, in conjunction with the neighbor pointers 804, 806, are used by memory manager 304 to manage all the memory nodes 702 in a memory block 402, including coalescing consecutive unused memory nodes 702 in a memory block 402, as described in more detail below.

A considerable time may be consumed to store a display list in memory pool 310 since the number of graphics calls 307 forwarded to memory pool 310 can be significant. To continually manage memory pool 310 during such periods, memory manager 304 identifies such memory nodes as being "used." Conversely, those that are not currently receiving primitive data and are otherwise available for future allocation are referred to as "free" memory nodes. Once display list compiler 302 completes storing a display list in memory pool 310, it notifies memory manager 304 with a display list complete signal 317. At that time, and as will be described in greater detail below, memory manager 304 forwards to display list compiler 302 a pointer 319 to the region of display list memory containing the display list. The management of free and used memory nodes will now be described.

In accordance with one aspect of the present invention, memory manager 304 maintains a list of memory nodes 702 that are currently being used to store graphics calls while a display list is being generated ("used") as well as those memory nodes that are available for future allocation ("free"). As noted, free memory nodes may include memory nodes created from unused portions of a memory node or from memory nodes containing deleted display lists or portions thereof. Such lists are referred to herein as the "free list" and "used list," respectively. Memory manager 304 uses memory nodes 702 from the free list to satisfy memory requests 303 from display list compiler 302 without making a system-level memory allocation call 309, if possible. That is, memory manager 304 satisfies requests first with previously acquired memory in memory pool 310 that is unused, resorting to a system-level request for additional memory only when necessary.

In one embodiment, the used and free lists are stored in memory pool 310. Preferably, the lists are included in memory management data 800 and are distributed across headers 704 of each memory node 702. In such an embodiment, memory manager 304 maintains locally pointers referred to as the "free list pointer," to the first memory node 702 in the free list, and a "used list pointer" to the first memory node 702 in the used list. As with the memory block list and the memory node list, each header 704 includes a pair of pointers to the neighboring used and free memory nodes. However, a memory node 702 may either be used or it may be free; that is, the two states are mutually exclusive of each other. Thus, in one preferred embodiment, a header 704 of each node 702 includes a single pair of pointers 810, 812 that comprise a portion of either the used list or the free list and a state flag 814 that indicates the current state, used or free, of the node 702. As memory nodes are provided to the display list compiler for storing graphics calls, the memory nodes 702 are removed from the free list and placed on the used list. When generation of a display list is complete, a pointer to the first of a list of memory nodes occupied by the display list (that is, the used list) is provided to display list compiler 302, and the memory nodes in the used list are removed from the used list.

Preferably, the used and free lists are implemented as circular doubly-linked lists, with the pair of pointers 810, 812 referring to the previous and subsequent used or free memory node, respectively. Each memory node 702 in the used and free lists, then, has a link to the next subsequent and previous node in the list. The pointer 812 of the last memory node 702 links that memory node to the first memory node; similarly, previous pointer 810 of the first memory node links the first memory node to the last memory node of that list. In alternative embodiments, the memory block list may be implemented as a conventional doubly-linked list.

In one embodiment of the present invention, the free list is sorted in descending size order, so that the largest free memory node 702 is at the top of the free list. As a result, memory manager 304 can provide the largest available free memory node 702 to display list compiler 302 in response to a request for memory by providing memory node 702 at the top of the free list. If the first node in the free list does not have sufficient memory to satisfy the memory request 303, then, in this embodiment, memory is acquired from the system. Alternatively, the free list is not maintained in any order and memory manager 304 determines the size of each available memory node to make the same determination. Thus, memory manager 304 maintains locally a minimal amount of memory management data. The free list pointer points to the first node in the free list; the used list pointer points to the first node in the used list. Thus, no table or other data structure is required to be separately maintained to manage used and free memory nodes in this aspect of the present invention.

Memory management data 800 also includes additional node state information 814. State information 814 includes three flags or regions in the illustrative embodiment. A used/free flag 816 indicates whether the associated memory node 702 is free or used. A full flag 818 is used to indicate when a memory node 702 includes available memory locations in data region 706. As will be described in detail below, this flag is used to determine whether a memory node 702 includes any memory locations that may be used to satisfy a memory allocation request. A top node flag 820 indicates whether a memory node 702 is the top memory node in the memory block 402 containing the memory node. In one embodiment of the present invention, the state information is represented as a byte that is interpreted as a bit field, in which each of the three flags described above (i.e., the free flag, the full flag, and the top node flag) is assigned a particular bit.

Lastly, each memory node 702 includes in its header 704 a size field 802 representing the size of the memory node's data region and a free pointer 808 that points to the top-most memory location (i.e., the memory location having the lowest memory address) in the memory node 702 that is free.

FIG. 9 is a diagram that illustrates a memory node 702 that is currently being used to receive display list data. In the illustrated state, the memory node data region 706 includes a used portion 904 in which is stored primitive data, and a free portion 806 that is still available. When a memory node is created or freed, the free pointer 808 points to the topmost location in the data region of the memory node. As data are stored in the memory node, the free pointer is advanced within the memory node accordingly.

When graphics application 302 completes generating a display list, any free memory 906 that was allocated for the display list but that was not used to store the display list is returned by memory manager 304 as a new memory node 702 in the memory block 402. In this way, the display list that was generated occupies only the amount of memory that is needed to store it, and the unused memory can be used to store subsequently generated display lists. Furthermore, the freed region 906 is coalesced with other free memory in the memory block 402 to minimize the amount of fragmentation in the memory pool 310. The manner in which the free portion 906 of a memory node 702 is processed is described in detail below.

Figure 10:
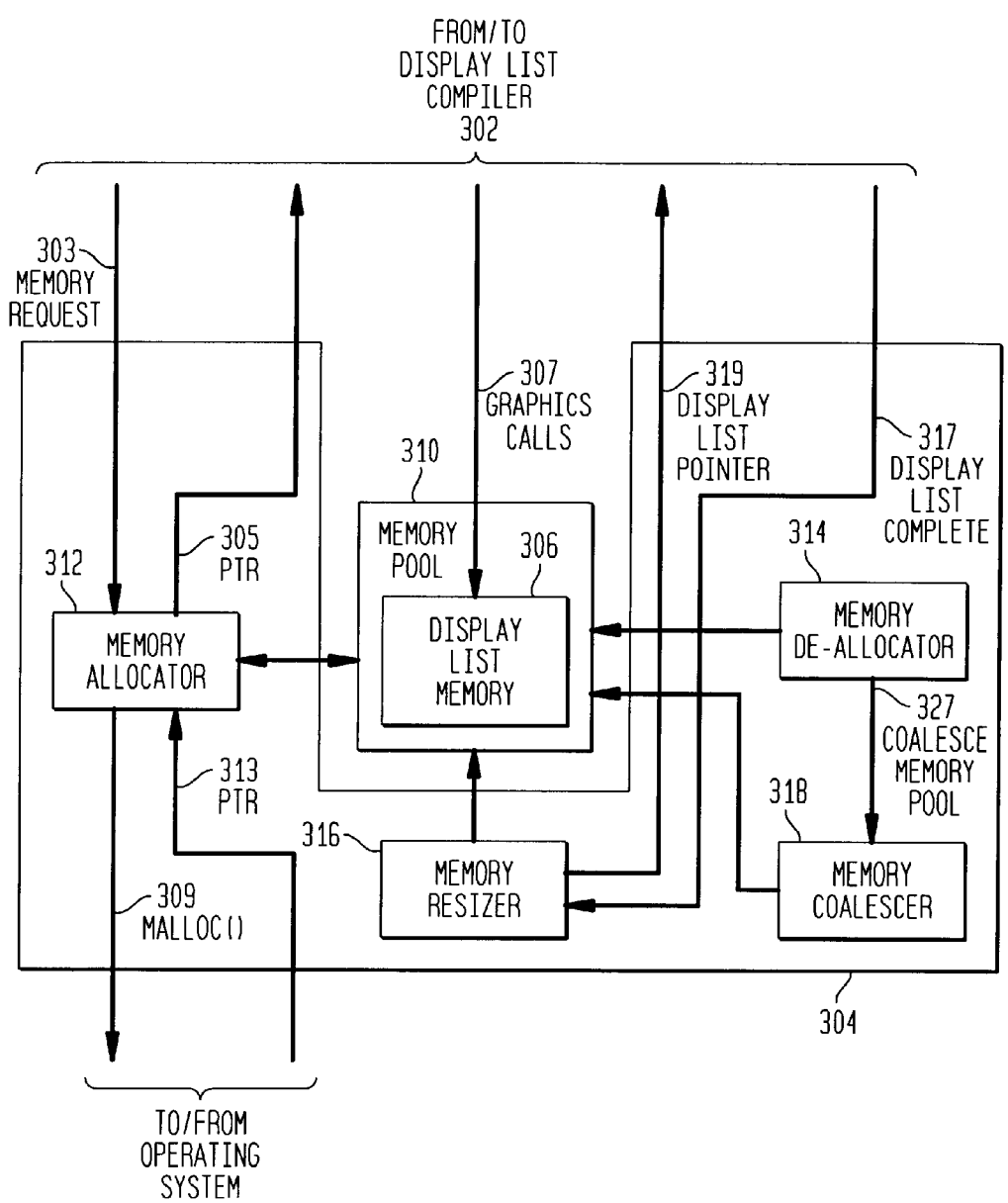
FIG. 10 is a functional block diagram of the components of the memory manager according to one embodiment of the present invention.

FIG. 10 is a functional block diagram of the components of memory manager 304 in accordance with one embodiment of the present invention. In the illustrative embodiment, memory manager 304 includes a memory allocator 312. Upon receipt of a graphics call indicating the beginning of a new display list (e.g., glNewList( )), display list compiler 302 generates the request for memory 303 to store the graphics calls. In response to memory request 303, memory allocator 312 allocates the requested amount of memory and returns to display list compiler 302 the pointer 305 to the allocated memory. As described in more detail below, the memory allocator 312 may allocate memory either by obtaining memory from memory pool 310, if there is sufficient memory in the memory pool 310 to satisfy the memory request 303, or by acquiring system memory using a system-level call 309 and receiving the pointer 313 to the requested memory from the operating system. In either case, memory allocator 312 returns the pointer 305 to the display list compiler 302 in response to the memory request 303.

Memory manager 304 also includes a memory resizer 316. Once display list compiler 302 completes storing a display list in memory pool 310, it notifies memory resizer 316 with a display list complete signal 317. As will be described in detail below, memory resizer 316 resizes memory nodes in memory pool 310 to eliminate unused portions of the memory nodes 702. Resizing involves dividing each partially used (that is, non-full) memory node 702 in the used list into a full memory node that includes the used portion 904 in its data region and a free memory node that includes free portion 906 in its data region. Resizing memory nodes 702 in the used list eliminates all unused memory from the memory nodes in the used list and returns such unused memory to memory pool 310 in the form of free memory nodes which can be allocated to subsequently generated display lists. After resizing the used list, memory resizer 316 passes to the display list compiler 302 a display list pointer 319 to a portion of display list memory 306 used to store the current display list.

Memory manager 304 also includes a memory deallocator 314. When graphics application 202 calls glDeleteList( ) to delete a display list, display list compiler 302 issues a delete display list signal 323 instructing memory deallocator 314 to return to memory pool 310 those memory nodes 702 in which the deleted display list is stored. Such freed memory nodes are thereafter available for subsequent reallocation to other display lists. Once memory deallocator 314 frees the memory nodes, it indicates their free status for subsequent reallocation operations.

Memory manager 304 further includes a memory coalescer 318. In one embodiment of the present invention, after memory deallocator 314 deallocates memory nodes, memory deallocator 314 sends a coalesce memory pool signal 327 to memory coalescer 318. In response, memory coalesce 318 coalesces neighboring (physically adjacent) free memory nodes in memory pool 310 into a single memory node having a data region that includes at least the data regions 706 from the coalesced memory nodes. Such coalescing results in the largest possible free memory nodes available for allocation to subsequently-generated display lists. In one embodiment, memory coalescer 318 further sorts the free list in descending size order subsequent to the above coalescing operations, so that the largest free memory node can be quickly identified and allocated by memory allocator 312 upon receipt of a subsequent memory request 303.

Figure 11:
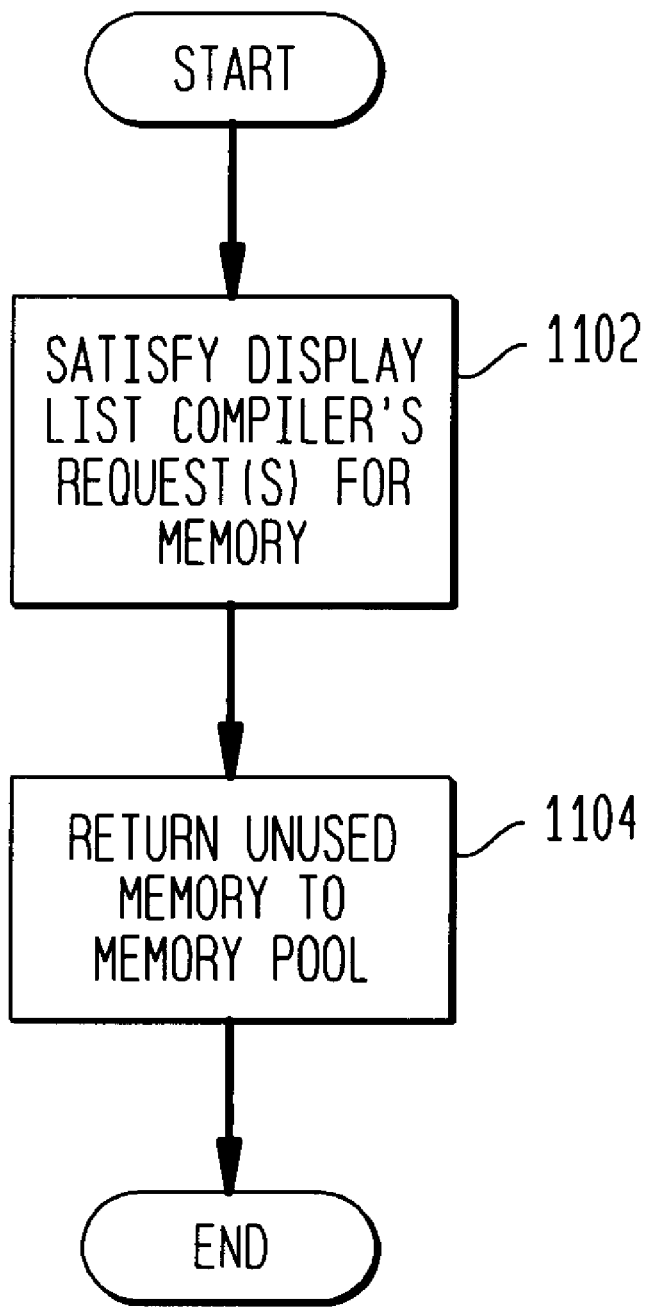
FIG. 11 is a high-level flowchart of one embodiment of the processes performed by the memory manager to manage the memory pool.

The operation of memory manager 304 will now be described with reference to FIGS. 11–25. In one aspect of the invention, memory manager 304 allocates to a display list only the amount of memory in memory pool 310 necessary to store the display list. FIG. 11 is a flowchart of one embodiment of the processes performed by memory manager 304 to allocate memory. In response to a request for memory from display list compiler 302, memory manager 304 allocates the requested amount of memory to the display list (step 1102). Display list compiler 302 stores the display list in the allocated memory. When display list compiler 302 finishes storing the display list in the allocated memory, memory manager 304 returns any unused portion of the allocated memory to memory pool 310 (step 1104) such that the returned memory may be allocated to subsequently-generated display lists.

Figure 12:
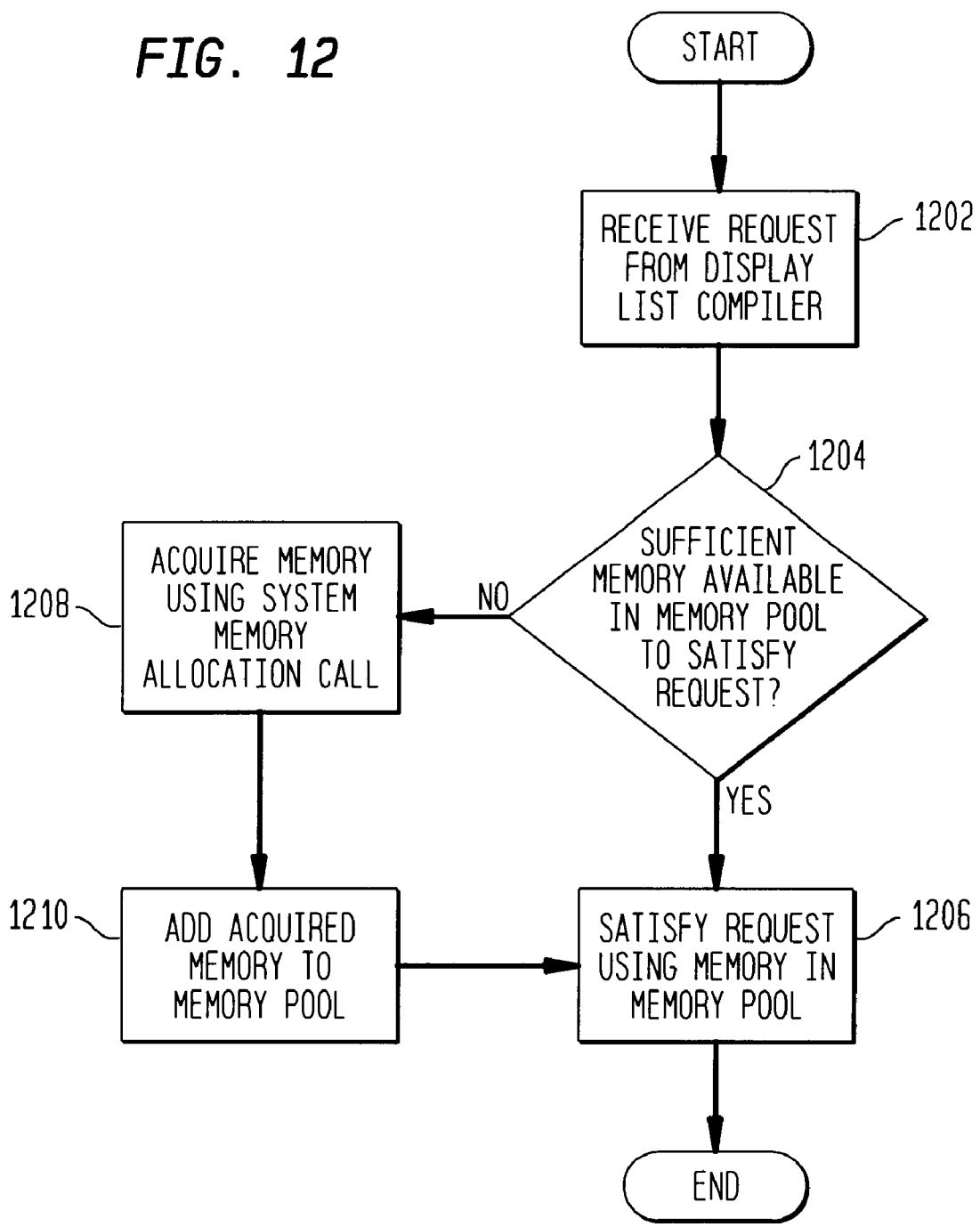
FIG. 12 is a flow chart of the processes performed by one embodiment of the memory manager to satisfy the display list compiler's request to allocate memory.

In one embodiment of the present invention, memory manager 304 satisfies the display list compiler's request to allocate memory (step 1102) as follows. Referring to FIG. 12, memory manager 304 receives a request from display list compiler 302 for a specified amount of memory (step 1202). If sufficient memory in memory pool 310 is available to satisfy the display list compiler's request (that is, the cumulative size of memory nodes 702 on the free list is greater than the amount of the requested memory) memory manager 304 satisfies the request using the available or free memory in memory pool 310 (step 1206). Otherwise, memory manager 304 requests that system memory be allocated using a system-level memory allocation call (e.g., malloc( )) (step 1208), and adds the acquired memory to memory pool 310 (step 1210). Memory manager 304 then satisfies the display list compiler's request for memory using the additional memory in memory pool 310 (step 1206).

Figure 13:
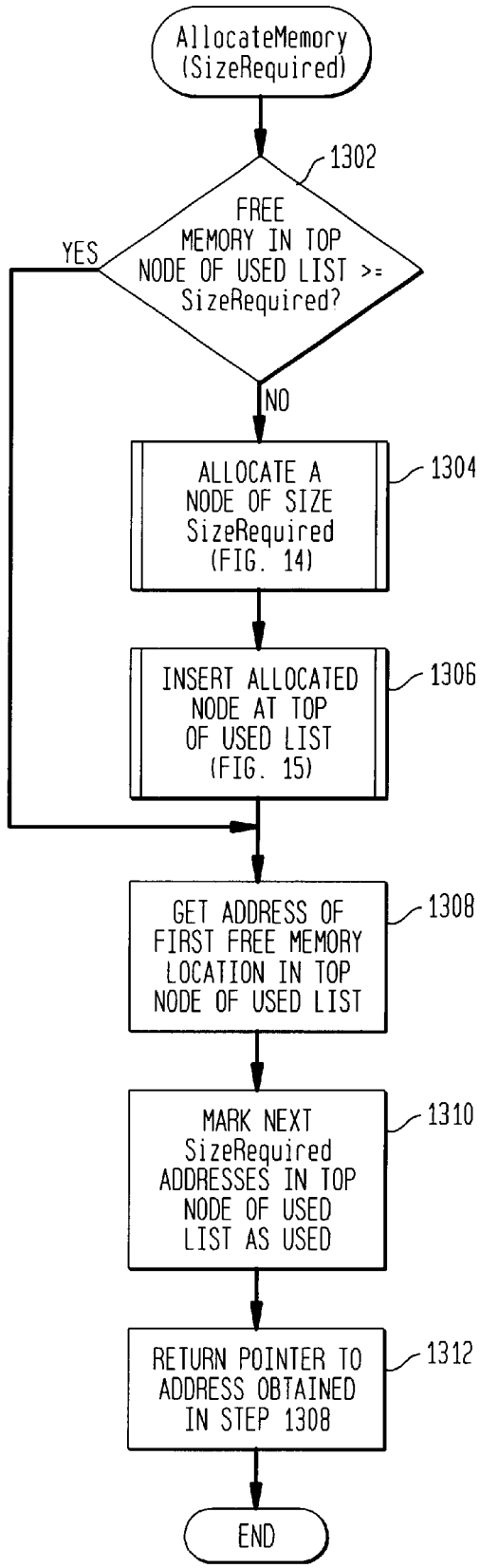
FIG. 13 is a detailed flow chart of one embodiment of the processes introduced in FIG. 12.

Referring to FIG. 13, in one embodiment of the present invention in which memory manager 304 is implemented as an object in an object-oriented programming language, display list compiler 302 requests memory from memory pool 310 by calling a memory manager method named AllocateMemory( ), which has a single parameter named SizeRequired that indicates the amount of memory being requested. Display list compiler 302 typically calls AllocateMemory( ) for each graphics call for which primitive data needs to be stored. If the amount of free memory in the top memory node of the used list is greater than or equal to SizeRequired (step 1302), then memory manager 304 obtains the address of the first free memory location in the top node of the used list (step 1308), and marks as "used" the equivalent number of memory addresses following the first free memory location in the node (identified by free pointer 808) (step 1310).

For example, the memory addresses may be marked as used by adding SizeRequired to the free pointer 808 of a memory node 702. Memory manager 304 then returns to display list compiler 302 the memory address retrieved in step 1312, described above. As previously described, memory manager 304 is thus able to satisfy a memory allocation request from display list compiler 302 without making a system-level memory allocation call if there is sufficient free memory in memory pool 310 to satisfy the display list compiler's request, thereby satisfying the display list compiler's request much more quickly than would be possible using a system-level memory allocation call.

If there is insufficient memory in the top node of the used list to satisfy the request (step 1302), memory manager 304 allocates a memory node of size SizeRequired (step 1304), and then inserts the allocated node at the top of the used list (step 1306) prior to performing steps 1308–1312. The processes performed at steps 1304 and 1306 are described in detail below with reference to FIGS. 14 and 15, respectively.

Figure 14:
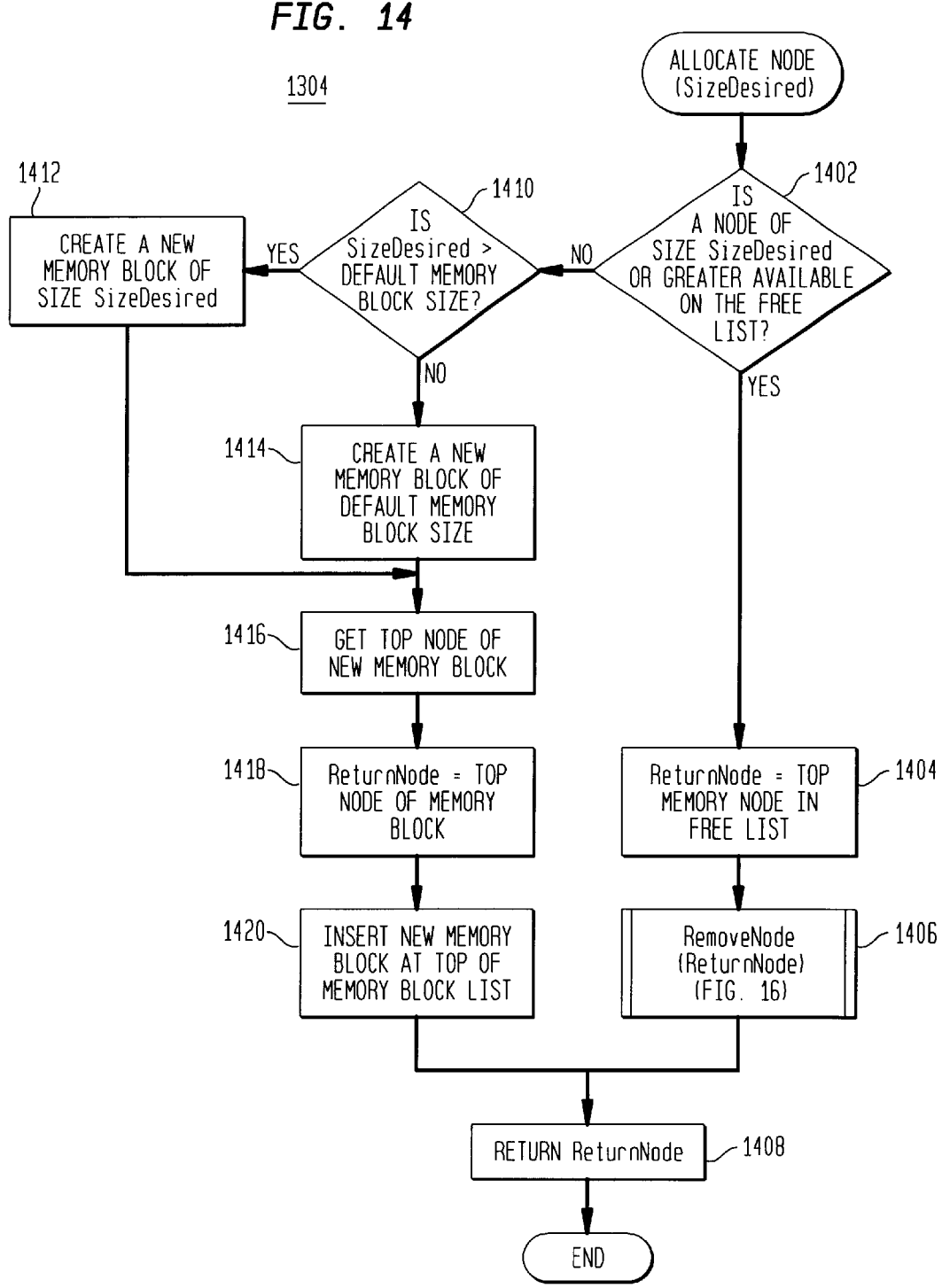
FIG. 14 is a flow chart of the processes performed to allocate a memory node.

FIG. 14 is a flow chart of the processes performed at step 1304. In one embodiment of the present invention, memory manager 304 allocates a memory node 702 by calling a method named AllocateNode( ) having a single parameter named SizeDesired that indicates the size of the desired memory node. If a memory node 702 of size SizeDesired or greater is available on the top node of the free list (step 1402), memory manager 304 removes the top memory node from the free list and returns a pointer to the memory node 702 to the display list compiler 302. In one embodiment of the present invention, memory manager 304 performs these steps by (1) storing a pointer to the top memory node in the free list in a pointer named ReturnNode (step 1404), (2) removing the top memory node from the free list (step 1406), and (3) returning the pointer ReturnNode (that is, a pointer to the memory node 702 that was removed from the top of the free list in step 1406) to display list compiler 302 (step 1408). The processes performed at step 1406 are described in detail below with reference to FIG. 16.

If a memory node 702 of size SizeDesired or greater is not available on the free list (step 1402), memory manager 304 creates a new memory block 402, which, as described below, contains a single memory node 702 covering the entire data region 404 of the memory block 402. If the value of SizeDesired is greater than the default memory block size (step 1410), memory manager 304 creates a new memory block 402 that is of the size SizeDesired (step 1412). If the value of SizeDesired is less than the default memory block size (step 1410), memory manager 304 creates a new memory block 402 that is of the default memory block size (step 1414). Memory manager 304 inserts the memory block created in either step 1412 or 1414 at the top of the memory block list and returns a pointer to the top memory node in the newly created memory block to display list compiler 302. In one embodiment of the present invention, memory manager 304 performs these steps by (1) storing a pointer to the top node of the memory block 402 in a pointer named ReturnNode (steps 1416 and 1418), (2) inserting the new memory block 402 at the top of the memory block list (step 1420), and (3) returning the pointer ReturnNode (a pointer to the top node of the newly created memory block) to display list compiler 302 (step 1408).

Figure 15:
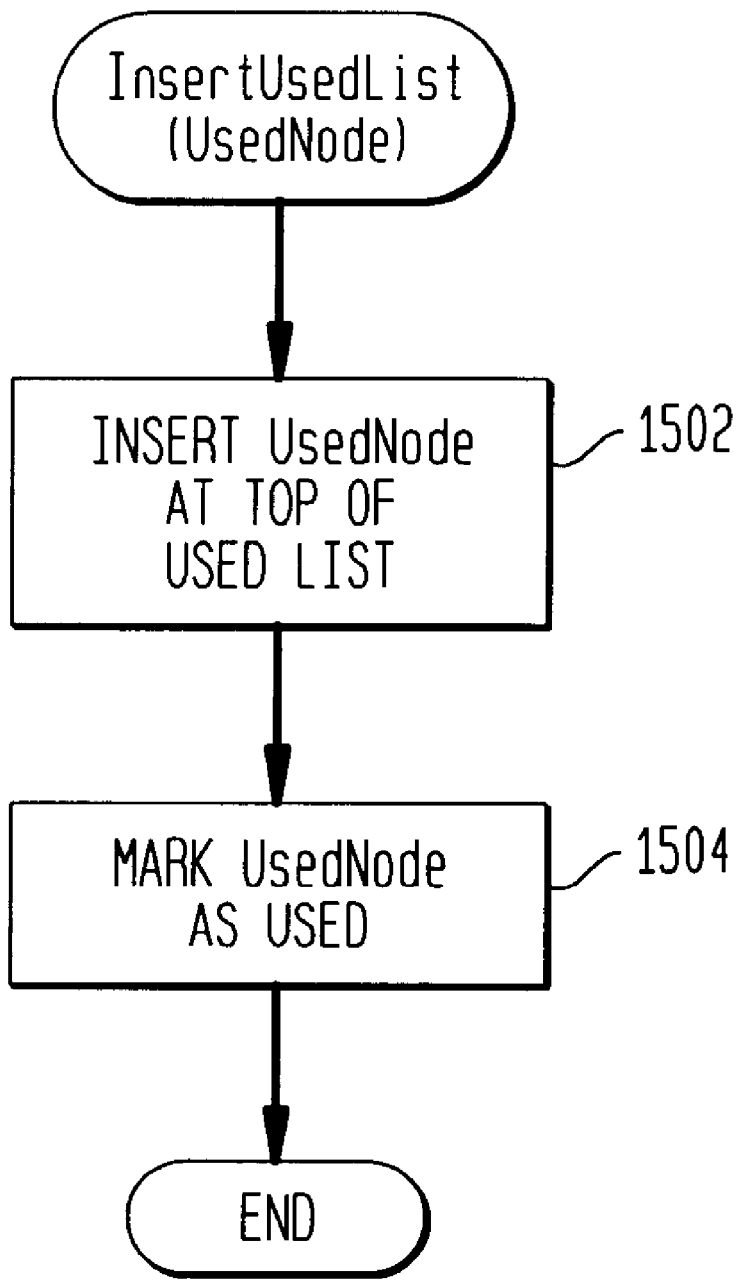
FIG. 15 is a flow chart of the processes performed to insert a memory node onto a used list in accordance with one embodiment of the present invention.

As noted above with respect to step 1306, in one embodiment of the present invention, memory manager 304 inserts a node at the top of the used list by calling a method of memory manager 304 named InsertUsedList. The call includes a single parameter named UsedNode, representing a pointer to the memory node 702 that is to be inserted. Referring to FIG. 15, in one embodiment in which the used list is implemented as a doubly-linked list, memory manager 304 inserts the memory node UsedNode at the top of the used list (step 1502). The memory manager implements standard techniques for inserting elements into doubly-linked lists, including updating the neighbor pointers 804, 806 in the headers 704 of the appropriate memory nodes 702. Memory manager 304 then marks the memory node UsedNode as used (step 1504). In one embodiment of the present invention, memory manager performs this step by setting the value of the memory node UsedNode's used/free flag to indicate the memory node is used.

Figure 16:
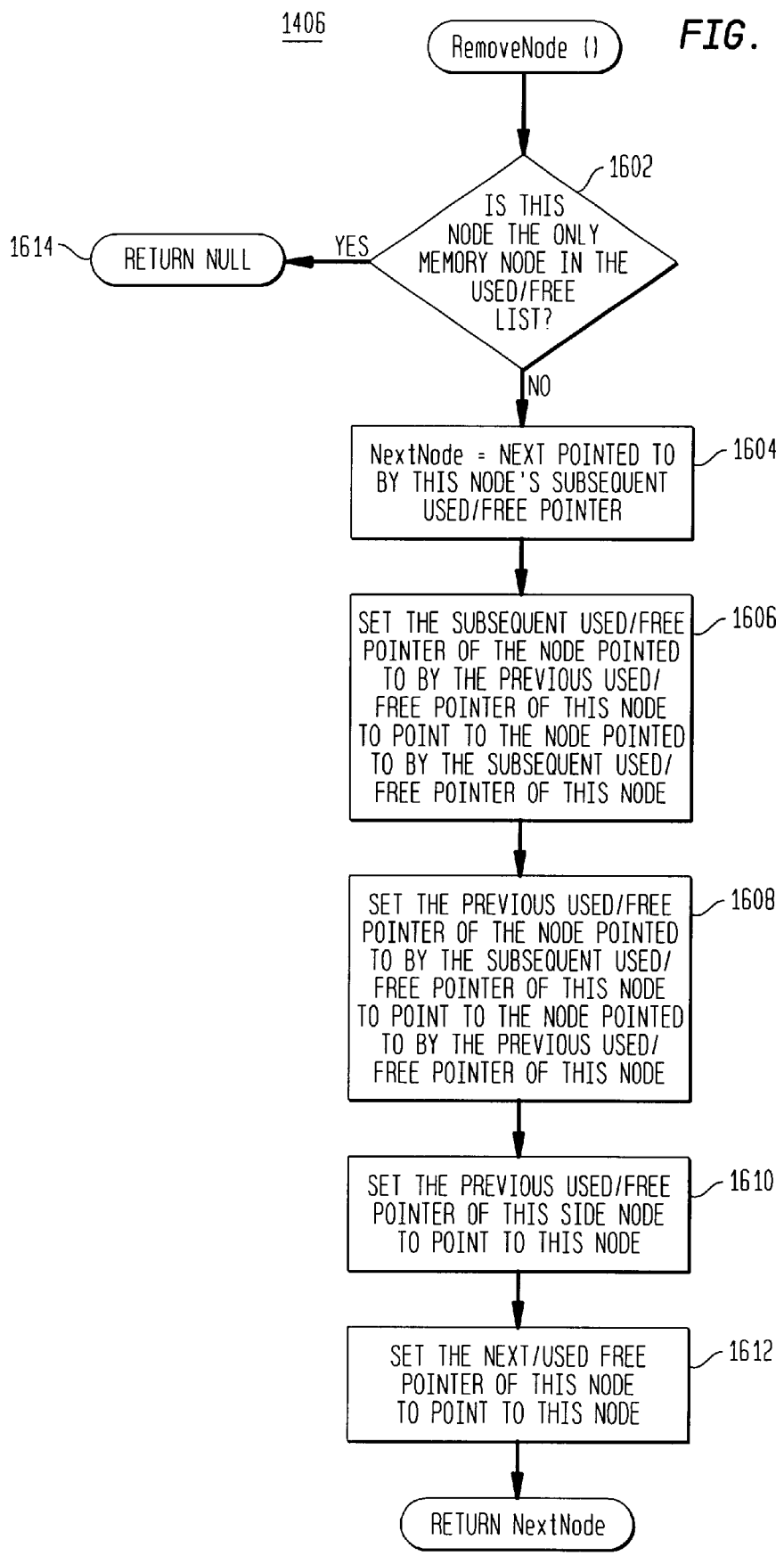
FIG. 16 is a flow chart of the processes performed to remove a memory node from the used or free lists in accordance with one embodiment of the present invention.

FIG. 16 is a flow chart of the processes performed to remove a node as described above with reference to step 1406. In one embodiment of the present invention in which memory nodes are implemented as objects according to an object-oriented programming language, memory manager 304 removes a memory node 702 from either the used list or the free list by calling a method named RemoveNode associated with the memory node to be removed. If the memory node 702 is on the used list, RemoveNode removes the memory node from the used list; otherwise, RemoveNode removes the memory node from the free list. In the following description, the term "used/free list" refers to the one of the free list and the used list of which the memory node is a member.

In the following description, the memory node to be removed is referred to as the "current node," the memory node above the current node in the used/free list is referred to as the current node's "previous neighbor node," and the memory node below the current node in the used/free list is referred to as the current node's "subsequent neighbor node." If the current node is the only memory node in the used/free list (step 1602), the current node empties the used/free list. For example, in an embodiment of the present invention the current memory node empties the used/free list by setting memory manager's used list pointer to point to a null value (step 1614). If the current node is not the only memory node in the used/free list, the memory node removes itself from the used/free list by appropriately updating the pointers in the used/free list so that they no longer point to the current node (steps 1606, 1608). That is, pointers 810, 812 of the used/free list neighboring memory node headers 704 are adjusted to reference to each other rather than to the current memory node.

For example, in one embodiment of the present invention, the current memory node sets the subsequent used/free node pointer 812 of the current node's previous neighbor node to point to the current node's subsequent used/free node (step 1606), and sets the previous used/free pointer 810 of the current node's next used/free node to point to the current node's previous neighbor node (step 1608). In one embodiment, the current memory node also sets its previous used/free and subsequent used/free node pointers 808, 812 to point to itself (steps 1610, 1612).

FIG. 17 is a flow chart of a process performed by memory manager 304 to create a new memory block. Such a process can be performed, for example, at steps 1414 or 1412. In one embodiment of the present invention in which memory blocks 402 are implemented as objects according to an object-oriented programming language, memory manager 304 creates a new memory block 402 by calling a memory block method named CreateNewMemoryBlock, which has a single parameter named FreeSize indicating the size of the memory block region to be created. In one embodiment of the present invention, CreateNewMemoryBlock adds the size of the memory block header region 406 and the size of the memory node header region 704 to the requested memory region size to determine the total amount of memory to allocate for the memory block (step 1702).

A system-level memory allocation call such as malloc( ) is then called to acquire, from system memory, the calculated amount of memory for the memory block (step 1704). A single memory node 702 is created that is the same size as the data region 404 of the new memory block 402 (step 1706). This process is described in detail below with reference to FIG. 18. The memory management data 500 in memory block header 406 is then updated to reflect the current state of the memory block. Specifically, top memory node pointer 506 in memory block header 406 is adjusted to reference the first address of the memory node (step 1708).

The memory block list is then updated (step 1710). Specifically, in the circular, doubly-linked list embodiment described above, the pointers 502 and 504 of the first and last memory blocks, respectively, in the memory block list are adjusted to refer to the new memory block rather than each other. The process ceases and returns a pointer to the allocated memory to the calling routine (step 1712).

FIG. 18 is a flow chart of the processes performed by memory manager 304 at step 1706 to create a new memory node 702. In one embodiment of the present invention in which memory nodes are implemented as objects according to an object-oriented programming language, the memory node class includes a method named CreateNewMemoryNode for creating a new memory node 702. CreateNewMemoryNode has a single parameter FreeSize indicating the size of the data region of the memory node to be created.

The state information 814 of the memory node is initialized (step 1802). In one embodiment of the present invention, used/free flag 816 in the memory node header 704 is initialized to a value of true, indicating that the memory node is free. Full flag 818 is initialized to a value of false, indicating that the memory node is not full, and top node flag 820 is initialized to false, indicating that the memory node is not the top node in a memory block 402. Memory node size 802 of the memory node is initialized to the value of the parameter FreeSize (step 1804). The previous neighbor pointer 804 and the subsequent neighbor pointer 806 of the memory being created are initialized to point to the memory node itself (steps 1806, 1808). The memory node's free pointer 808 is initialized to point to the first memory address in the memory node's data region 706 (step 1810).

Figure 19:
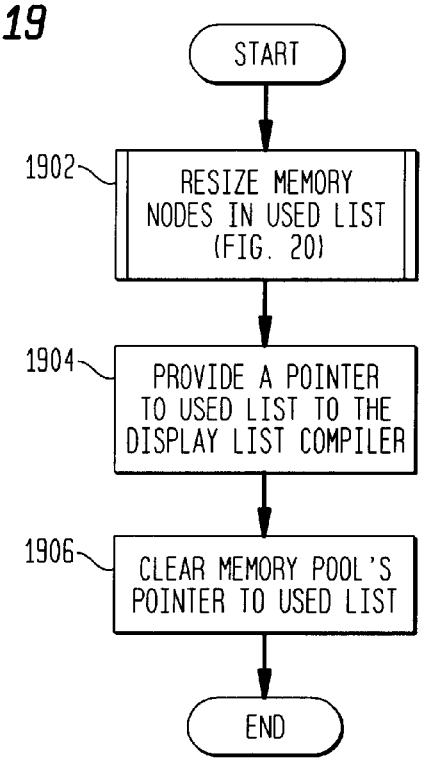
FIG. 19 is a detailed flowchart of the processes performed to return memory nodes to the memory pool in accordance with one embodiment of the present invention.

As noted, in one aspect of the invention, the memory nodes 702 are resized to eliminate unused portions of memory nodes 702. FIG. 19 is a flowchart of the processes performed by memory manager 304 to resize memory nodes 702. As noted, display list compiler 302 returns unused memory to the memory pool. In one embodiment of the present invention, display list compiler 302 instructs memory manager 304 to "resize" the memory nodes 702 in the used list (step 1902). This may be achieved through any number of implementations. For example, display list compiler 302 may indicate to memory manager 304 that it has completed storing the display list in the memory nodes 702 in the used list. Either compiler 302 or memory manager 304 may determine whether a free portion 906 is available in the memory node 702.

As described in more detail below, resizing the memory nodes in the used list refers to dividing each partially used (i.e., non-full) memory node 702 in the used list into a first full memory node that includes in its data region used portion 904 of the partially used memory node and a second free memory node 702 that includes free portion 906 in its data region. Resizing the memory nodes 702 in the used list eliminates all unused memory from the memory nodes in the used list and returns such unused memory to memory pool 310 in the form of free memory nodes which can be allocated to subsequently generated display lists. Step 1902 is described in greater detail below with reference to FIG. 20.

After memory manager 304 resizes the memory nodes in the used list, display list compiler 302 requests the memory in the used list, in response to which memory manager 304 provides a pointer to the beginning of the used list as display list pointer 319 (step 1904). Memory manager 304 then clears its pointer to the used list, effectively emptying the used list (1906). Display list compiler 302 now holds a pointer 319 to a list of memory nodes 702 containing display list data.

Figure 20:
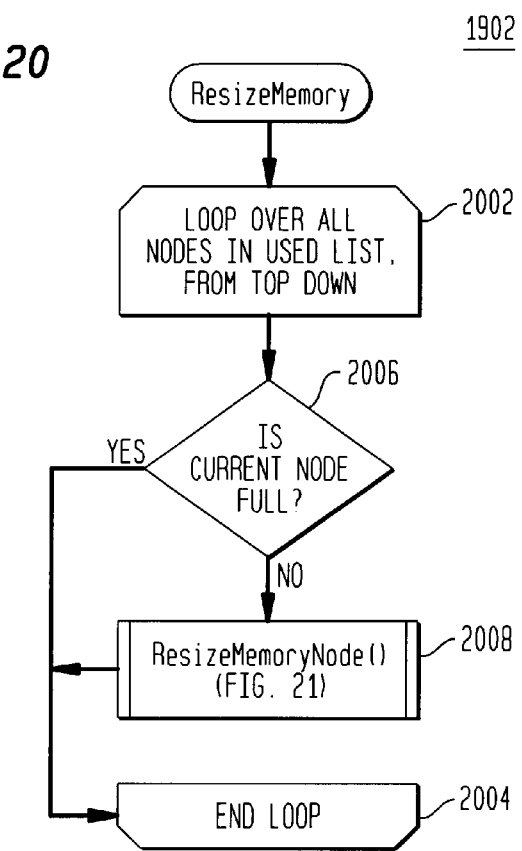
FIG. 20 is a flow chart of the processes performed to evaluate memory nodes in the used list to determine whether resizing operations can be performed in accordance with one embodiment of the present invention.

FIG. 20 is a flow chart of the processes performed to resize memory nodes as noted above with respect to step 1902. In one embodiment of the present invention, display list compiler 302 requests that memory manager 304 resize the memory nodes 702 in the used list by calling a method of memory manager named ResizeMemoryNodes. This method loops over all memory nodes 702 in the used list, preferably from the top down (steps 2002, 2004). For each memory node 702 in the used list, if the memory node is not full (step 2006), memory manager 304 resizes the memory node (step 2008). Step 2008 is described in detail below with reference to FIG. 21.

FIG. 21 is a flow chart of the processes performed to resize memory nodes as noted above with respect to step 2008. In one embodiment of the present invention, memory manager 304 resizes a memory node Node 702 by calling a method of the memory pool named ResizeNode. ResizeNode has a single parameter named Node, which is a pointer to the memory node to be resized.

A variable named UsedSize is assigned a value corresponding to the amount of memory in used portion 904 in the memory node Node (step 2102). The amount of used memory may be calculated, for example, by subtracting the address of the top of the memory node's data region 706 from the address of the memory node's free pointer 808. A variable named FreeSize is assigned a value corresponding to the amount of free memory in the memory node Node (step 2104). The amount of free memory in a memory node may be calculated, for example, by subtracting UsedSize from the size of the memory node's data region 706 (step 2106). Memory manager 304 then creates a new node named NewNode occupying the free memory in the node Node (step 2108). This process is described above with reference to FIG. 18.

Memory manager 304 inserts the node NewNode after the node Node in the memory node list in which the memory node Node resides (step 2110). This includes, for example, adjusting the neighbor pointers 804, 806 in header 704 of the appropriate memory nodes in the memory block. Memory manager 304 coalesces the memory node NewNode with the memory node below the memory node Node in the neighbor list, if possible (step 2112). This process is described below with reference to FIG. 22. Memory manager 304 inserts the memory node NewNode on the free list (step 2114).

FIG. 22 is a flow chart of the processes performed at step 2112. In one embodiment of the present invention, memory manager 304 coalesces a free memory node with the memory node below it in a memory block by calling a method named FreeNodeBelow, which has a single argument named FreeNode indicating the node to be coalesced. If FreeNode is the last node in its memory block (step 2202), then it is not possible to coalesce FreeNode with a memory node below it, and the routine FreeNodeBelow terminates. If the memory node after FreeNode is not free (step 2204), then it is not possible to coalesce FreeNode with the node below it, and the routine FreeNodeBelow terminates. Otherwise, FreeNode is coalesced with the memory node below it. In the illustrative embodiment, the size of the memory node below FreeNode is added to the size of FreeNode (step 2206). The node below FreeNode is then removed from either the free list or the used list (step 2208, FIG. 16) and the node below FreeNode is removed from the neighbor list of the memory block in which it is contained (step 2210).

Figure 23:
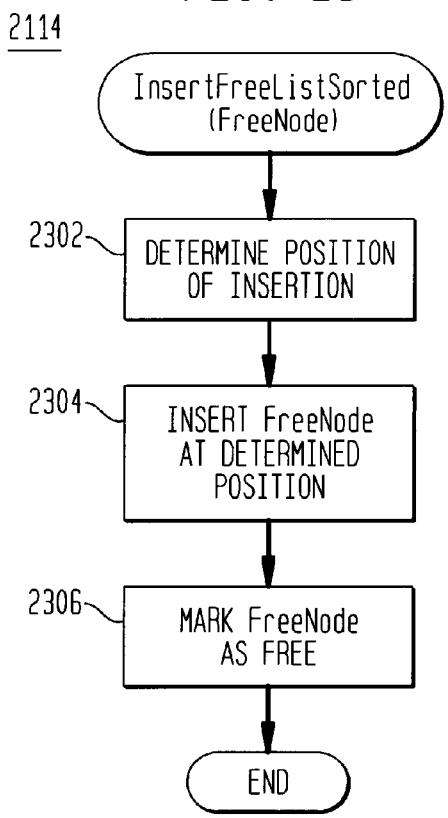
FIG. 23 is a detailed flow chart of the processes performed to add a memory node into the free list in accordance with one embodiment of the present invention.

FIG. 23 is a flow chart of the processes performed at step 2112 introduced above. In one embodiment of the present invention, memory manager 304 inserts a memory node 702 into the free list using a memory manager method named InsertFreeListSorted, which inserts a memory node 702 into a location in the free list such that the free list is sorted in descending size order. InsertFreeListSorted has a single parameter FreeNode, indicating a pointer to the memory node to be inserted into the free list. Maintaining the free list in descending size order allows memory manager 304 to quickly provide the display list compiler 302 with the largest free memory node available in response to a request from the display list compiler 302 to allocate memory.

The position at which the memory node FreeNode is to be inserted into the free list is determined (step 2302). This may be accomplished by, for example, comparing the size of the memory node FreeNode to each of the memory nodes in the Free List, beginning at the top memory node in the Free List, and determining that the memory node FreeNode should be inserted before the first memory node encountered that is smaller than the memory node FreeNode. Memory manager 304 then inserts the memory node FreeNode at the determined position (step 2304). Memory manager 304 marks the memory node FreeNode as being free (step 2306). In one embodiment of the present invention, this is accomplished by assigning a value of true to FreeNode's used/free flag 816.

As noted, graphics application 202 can delete a display list by issuing a display list deletion call, such as glDeleteList( ) in OpenGL. When the graphics application calls glDeleteList( ) to delete a display list, display list compiler 302 instructs memory manager 304 to return the memory nodes 702 in the display list to memory pool 310 so that they are available for subsequent reallocation to other display lists. Memory manager 304 returns the memory nodes in the display list to the memory pool 310, indicates that they are free for subsequent allocation. As a result, memory nodes 702 that were previously used to store display list data can be reused by subsequently generated display lists without making a system-level memory allocation call, thus increasing the speed with which such memory can be provided for use. Furthermore, when memory manager 304 returns memory nodes 702 in the display list to memory pool 310, memory manager 304 coalesces consecutive free memory nodes in memory pool 310. Such coalescing results in the largest possible free memory nodes available for allocation to subsequently generated display lists.

Figure 24:
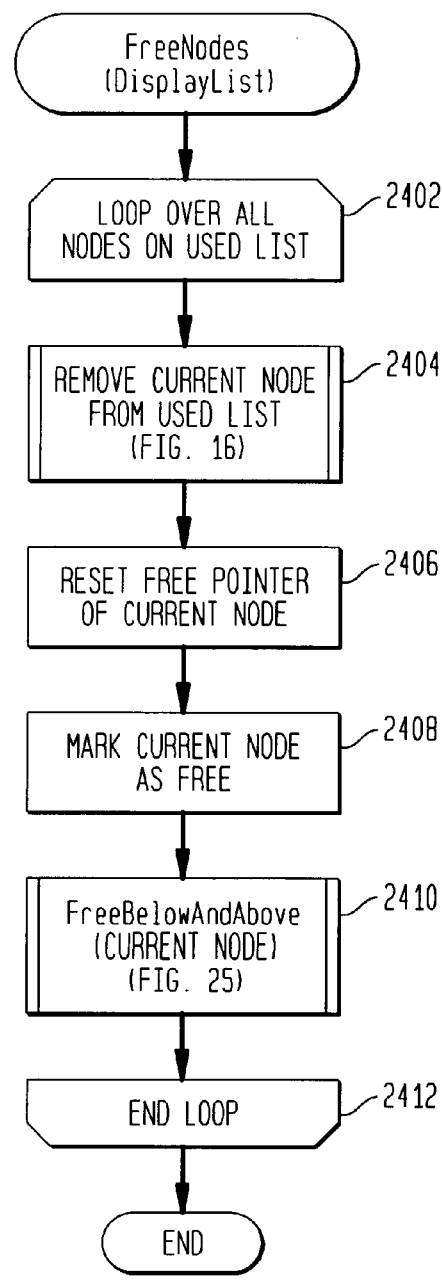
FIG. 24 is a flow chart of the processes performed to return a memory node to the memory pool, coalescing them as they are returned in accordance with one embodiment of the present invention.

FIG. 24 is a flow chart of the processes performed to return a memory node 702 to memory pool 310. In one embodiment of the present invention, display list compiler 302 instructs memory manager 304 to return memory nodes 702 in a display list to memory pool 310 by calling a memory manager method named FreeNodes. FreeNodes has a single parameter named DisplayList, which is a pointer to the display list to be returned to the memory pool. FreeNodes loops over all memory nodes in the list DisplayList (steps 2402, 2412). For each memory node, the memory node is removed from the list DisplayList (step 2402, FIG. 16), and the free pointer 808 of the memory node is reset to point to the top of the memory node's data region 706 (step 2406).

The memory node is then marked as being free (e.g., by assigning a value of True to the memory node's used/free flag 816 (step 2408), and the memory nodes above and below the memory node are coalesced with the memory node, if possible (step 2410). Step 2410 is described in greater detail below with reference to FIG. 25.

Figure 25:
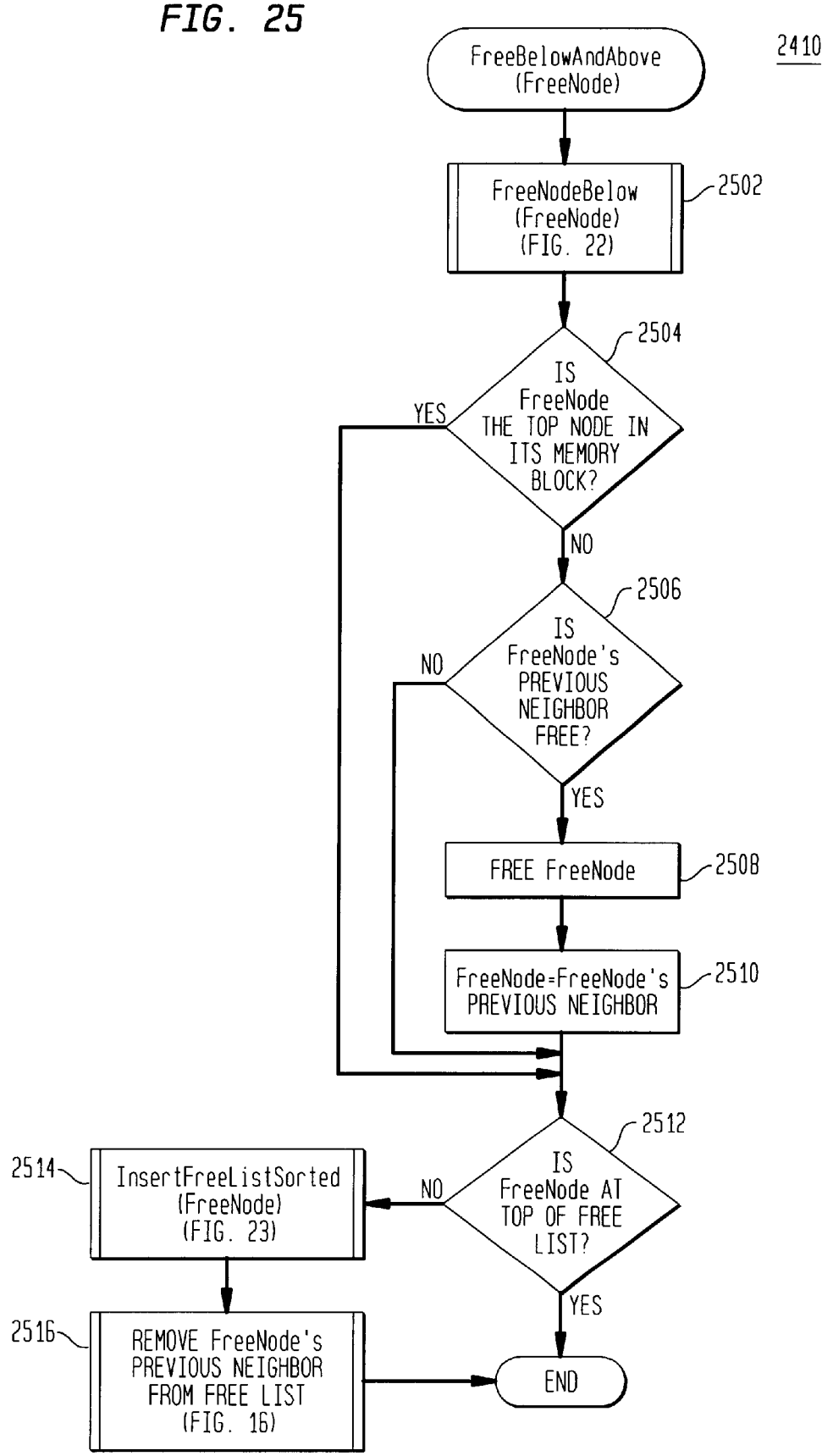
FIG. 25 is a flow chart of the processes performed to coalesce neighboring memory nodes in accordance with one embodiment of the present invention.

FIG. 25 is a flow chart of the processes performed to coalesce memory nodes 702 introduced above with respect to step 2410. In one embodiment of the present invention, memory manager 304 coalesces a memory node 702 with the memory nodes below and above it by calling a method named FreeBelowAndAbove( ) having a single parameter named FreeNode indicating the memory node to be coalesced.

FreeBelowAndAbove( ) calls FreeBelow( ) (described above with respect to FIG. 22) to free the memory node below FreeNode (step 2502). If FreeNode is not the top memory node in its memory block (step 2504), then memory manager 304 determines whether it is possible to coalesce FreeNode with the memory node above it as follows. If FreeNode's previous neighbor is free (step 2506), then it is possible to coalesce FreeNode with its previous neighbor. The memory manager 304 coalesces FreeNode with its previous neighbor as follows. Memory manager 304 frees the node (step 2508). This includes removing FreeNode's previous neighbor from the free list. Then memory manager 304 increases the size of FreeNode's previous neighbor by the size of FreeNode and removes FreeNode from the neighbor list of the memory block to which it belongs (step 2508). Next, the pointer FreeNode is set to point to FreeNode's previous neighbor, since FreeNode has been coalesced with its previous neighbor (step 2510).

After coalescing FreeNode with the nodes below and above it, FreeNode is resorted within the free list if it is not at the top of the free list. If FreeNode is not at the top of the free list (Step 2512), FreeNode is removed from the free list (step 2514), and then reinserted into the free list at a position determined by its size, as described above (step 2516; FIG. 16).

It should be understood that the present invention is not limited to use with any particular computer platform, processor, or programming language. Aspects of the present invention may be implemented in software, hardware, firmware, or a combination of the three. The various elements of the system, either individually or in combination, may be implemented as a computer program product tangibly embodied in a machine-readable storage device for execution by a computer processor. Various steps of embodiments of the invention may be performed by a computer processor executing a program (i.e., software or firmware) tangibly embodied on a computer-readable medium to perform functions by operating on input and generating output. The computer-readable medium may be, for example, a memory in a computer or a transportable medium such as a compact disk, a floppy disk, or a diskette, such that a computer program embodying the aspects of the present invention can be loaded onto any computer. The computer program is not limited to any particular embodiment, and may, for example, be an application s program, foreground or background process, driver, or any combination thereof, executing on a single computer processor or multiple computer processors. Computer programming languages suitable for implementing such a system include procedural programming languages, object-oriented programming languages, and combinations of the two.

While various embodiments of the present invention have been described above, it should be understood that they have been presented by way of example only, and not limitation. For example, it should be appreciated that the present invention may be implemented in other ways, and that the embodiments described herein are not limiting. For example, the optimization system of the present invention need not be implemented in display list driver 312. Alternatively, the optimization system and methodology may be implemented, for example, in software or hardware associated with driver 308, graphics hardware 304, graphics application 302 or in other operational positions within a graphics pipeline. It should be understood from this disclosure that the methods and techniques described herein with regard to the manner in which various components communicate and transfer data should not be construed as limiting, but merely one implementation of transferring the noted information. For example, a variable may be set in shared memory, a signal may be transmitted over a dedicated or shared line, or any one of a number of data bus techniques may be used. The implemented approach is a function of the selected embodiment of memory manager 304; implementation in a circuit, ASIC, etc., will have different requirements than, for example, a purely software implementation. Furthermore, the optimization system of the present invention may, for example, be implemented as a separate application program or as a separate component in host 108 or in graphics system 100 which intercepts graphics calls generated by graphics application 302. Thus, the breadth and scope of the present invention should not be limited by any of the above-described exemplary embodiments, but should be defined only in accordance with the following claims and their equivalents.

What is claimed is:

1. In a computer system having an operating system operatively coupled to a system memory and a graphics system, a method for allocating memory to store display lists for processing by the graphics system, the method comprising the steps of:

generating a system-level call to acquire a contiguous block of system memory logically comprising a data region defining a free memory node;

allocating the free memory node to a display list without generating a system-level call;

logically forming a portion of a memory block required to store the display list into a separately-managed used memory node, and any remaining portion of the memory block into a separately-managed free memory node that is not returned to system memory; and repeating the allocating and logically forming steps to store all or part of a next display list in the separately-managed free memory node.

2. The method of claim 1, wherein the memory block is one of a plurality of individually-acquired memory blocks that are logically associated in a locally-controlled memory pool.

3. The method of claim 1, wherein the generating step occurs in response to a request to store a display list in memory, wherein the size of the acquired memory block is greater than that necessary to store the display list.

4. The method of claim 1, wherein the memory block comprises a plurality of free memory nodes, and wherein the repeating step comprises:

selecting a free memory node that includes sufficient memory space to store the next display list;

allocating the selected free memory node to the next display list without generating a system-level call; and logically forming a portion of the selected memory node required to store the next display list into a separately-managed used memory node, and any remaining portion of the selected memory block into a separately-managed free memory node.

5. The method of claim 4, wherein the repeating step further comprises the steps of:

before the selecting step, determining whether the memory block comprises a memory node having sufficient space to store the next display list, wherein the selecting, allocating and logically forming steps are performed when the selecting step is determined affirmatively; and acquiring an additional memory block from system memory when step d) is determined negatively, wherein the selecting, allocating and logically forming steps are performed so as to store the next display list in the additional memory block.

6. The method of claim 1, wherein the memory nodes comprise data and header regions in which display list and memory management data are respectively stored, and wherein the used and free status of each memory node is maintained in one or more lists stored in the memory node header regions.

7. The method of claim 1, wherein the memory block is one of a plurality of individually-acquired memory blocks that are logically associated in a locally-controlled memory pool, each memory block also comprising a header region in which memory management data is stored.

8. The method of claim 1, wherein when the memory block comprises one or more used and free memory nodes the method further comprises the steps of:

e) coalescing the adjacent free memory nodes into a single separately-managed free memory node having a contiguous data region having a size equal to at least a sum of the sizes of the data regions of the coalesced memory nodes.

9. The method of claim 8, further comprising the steps of:

f) deallocating each memory node in the memory block as it is no longer needed to store display lists, wherein the deallocated memory node is not returned to system memory and is retained as a free memory node in the memory pool.

10. In a computer system having an operating system operatively coupled to a system memory and a graphics system, a memory manager for managing the storage of display lists as they are generated by graphics application, the memory manager comprising:

a memory resizer that acquires from system memory a memory pool of one or more memory blocks each comprising one or more memory nodes in which all or part of a display list can be stored, wherein the memory resizer resizes partially used memory nodes by logically forming a portion of a memory node required to store the display list into a separately-managed used memory node, and any remaining portion of the memory node into a separately-managed free memory node that is not returned to system memory.

11. The memory manager of claim 10, wherein the memory manager further comprises:

a memory allocator configured to allocate to the display list without generating a system-level call, one or more free memory nodes in the memory pool when sufficient memory to store the display list is available in the memory pool, and to acquire a block of memory from system memory using a system-level call when sufficient memory to store the display list is not available in the memory pool.

12. The memory manager of claim 10, wherein the memory allocator allocates the one or more memory nodes in response to a request to store a display list in memory, wherein when the memory allocator acquires a memory block from system memory, the acquired memory block has a size that is greater than that necessary to store the display list.

13. The memory manager of claim 10, wherein the memory nodes comprise data and header regions in which display list and memory management data are respectively stored, and wherein used and free status of each memory node is maintained in one or more lists stored in the memory node header regions.

14. The memory manager of claim 10, wherein the memory block is one of a plurality of individually-acquired memory blocks that are logically associated in a memory pool controlled by the memory manager, each memory block also comprising a header region in which memory management data is stored.

15. The memory manager of claim 10, wherein when the memory block comprises one or more used and free memory nodes, wherein the memory manager further comprises:

a coalescer that combines adjacent free memory nodes into a single separately-managed free memory node having a contiguous data region the size of which is approximately equal to at least a sum of the sizes of the data regions of the coalesced memory nodes.

16. The memory manager of claim 15, further comprising:

a deallocator that deallocates each memory node in the memory block as the memory node is no longer needed to store display lists, wherein the deallocator returns memory node is not returned to system memory and is retained as a free memory node in the memory pool.

17. The memory manager of claim 10, wherein the memory manager is an operational component of a display list driver that managing the storage of display lists as they are generated by graphics application and also comprises:

a display list compiler configured to generate a request for memory to store a display list upon receipt of a graphics call sequence from the graphics application; and a display list executor configured to retrieve a display list from the memory pool and to provide the display list to a graphics hardware driver of the computer system.

18. The memory manager of claim 17, wherein the display list compiler generates the request for memory prior to receiving information indicative of the size of the display list to be stored.

19. The memory manager of claim 18, wherein the memory request is a system-level call, and wherein the memory manager intercepts and processes the system-level call generated by the display list driver.

20. In a computer system having an operating system operatively coupled to a system memory and a graphics system, a memory manager for managing the storage of display lists as they are generated by graphics application, the memory manager comprising:

memory resizing means for acquiring from system memory a memory pool of one or more memory blocks each comprising one or more memory nodes in which all or part of a display list can be stored, and for resizing partially used memory nodes by logically forming a portion of a memory node required to store the display list into a separately-managed used memory node, and any remaining portion of the memory node into a separately-managed free memory node that is not returned to system memory.

21. The memory manager of claim 20, wherein the memory manager further comprises:

a memory allocator configured to allocate to the display list without generating a system-level call, one or more free memory nodes in the memory pool when sufficient memory to store the display list is available in the memory pool, and to acquire a block of memory from system memory using a system-level call when sufficient memory to store the display list is not available in the memory pool.

22. The memory manager of claim 20, wherein when the memory block comprises one or more used and free memory nodes, wherein the memory manager further comprises:

coalescing means for combining adjacent free memory nodes into a single separately-managed free memory node having a contiguous data region the size of which is approximately equal to at least a sum of the sizes of the data regions of the coalesced memory nodes.

23. The memory manager of claim 20, further comprising:

deallocating means for deallocating each memory node in the memory block as the memory node is no longer needed to store display lists, wherein the deallocating means returns memory node is not returned to system memory and is retained as a free memory node in the memory pool.

24. The memory manager of claim 20, wherein the memory manager is an operational component of a display list driver that managing the storage of display lists as they are generated by graphics application and also comprises:

a compiling means for generating a request for memory to store a display list upon receipt of a graphics call sequence from the graphics application; and a display list executing means for retrieving a display list from the memory pool and for providing the display list to a graphics hardware driver of the computer system.

* * * * *